United States Patent
Kitora et al.

(10) Patent No.: US 7,421,124 B2
(45) Date of Patent: Sep. 2, 2008

(54) IMAGE PROCESSING SYSTEM AND IMAGE PROCESSING METHOD

(75) Inventors: Masakazu Kitora, Kawasaki (JP); Yushi Matsukubo, Yokohama (JP); Hiroyuki Yaguchi, Yokohama (JP); Eiichi Nishikawa, Kawasaki (JP); Hiroyuki Tsuji, Yokohama (JP); Shinichi Kato, Kawasaki (JP); Kenzou Sekiguchi, Tokyo (JP); Hiroyoshi Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 726 days.

(21) Appl. No.: 11/002,120

(22) Filed: Dec. 3, 2004

(65) Prior Publication Data
US 2005/0123209 A1 Jun. 9, 2005

(30) Foreign Application Priority Data
Dec. 5, 2003 (JP) ............................. 2003-407770

(51) Int. Cl.
*G06K 9/00* (2006.01)
(52) U.S. Cl. .................. 382/181; 382/173; 382/176; 382/164; 705/37; 705/80; 705/14
(58) Field of Classification Search ................ 382/181, 382/190, 191, 124, 173, 176, 164; 705/37, 705/80, 14; 707/1, 3, 6, 10
See application file for complete search history.

(56) References Cited

U.S. PATENT DOCUMENTS

| 4,908,873 A | 3/1990 | Philibert et al. ............... 382/34 |
|---|---|---|
| 4,935,821 A | 6/1990 | Sano et al. ................... 358/427 |
| 5,111,514 A * | 5/1992 | Ohta ........................... 382/177 |
| 2001/0014176 A1* | 8/2001 | Kamada et al. ............. 382/181 |
| 2003/0210803 A1 | 11/2003 | Kaneda et al. .............. 382/100 |
| 2004/0151377 A1* | 8/2004 | Boose et al. ................ 382/193 |

FOREIGN PATENT DOCUMENTS

| CN | 1450495 A | 10/2003 |
|---|---|---|
| EP | 0 279 156 A2 | 8/1988 |
| EP | 1 605 348 A2 | 12/2005 |
| JP | 5-012402 A | 1/1993 |
| JP | 6-178100 | 6/1994 |
| WO | WO 01/71960 A1 | 9/2001 |
| WO | WO 02/099735 A1 | 12/2002 |

* cited by examiner

*Primary Examiner*—Matthew C. Bella
*Assistant Examiner*—Mike Rahmjoo
(74) *Attorney, Agent, or Firm*—Fitzpatrick, Cella, Harper & Scinto

(57) ABSTRACT

There are provided an image processing system and image processing method which can appropriately set whether to convert an original paper document into re-usable vector data before obtaining vector data from the paper document. An image scanning unit (110) scans a document to obtain image information, and a storage device (111) stores the image information. A data processing device (115) detects control information appended to the document from the image information and determines whether vectorization of the image information is permitted or inhibited. If the data processing device (115) determines that vectorization is permitted, it converts the image information into vector data; otherwise, it directly stores the image information in the storage device (111).

8 Claims, 23 Drawing Sheets

FIG. 5

BLOCK INFORMATION

| | PROPERTY | COORDINATE X | COORDINATE Y | WIDTH W | HEIGHT H | OCR INFORMATION |
|---|---|---|---|---|---|---|
| BLOCK 1 | 1 | X1 | Y1 | W1 | H1 | AVAILABLE |
| BLOCK 2 | 3 | X2 | Y2 | W2 | H2 | AVAILABLE |
| BLOCK 3 | 2 | X3 | Y3 | W3 | H3 | NOT AVAILABLE |
| BLOCK 4 | 1 | X4 | Y4 | W4 | H4 | AVAILABLE |
| BLOCK 5 | 3 | X5 | Y5 | W5 | H5 | AVAILABLE |
| BLOCK 6 | 5 | X6 | Y6 | W6 | H6 | NOT AVAILABLE |

PROPERTY 1 : text   2 : picture   3 : table   4 : line   5 : photo

INPUT FILE INFORMATION

| TOTAL NUMBER OF BLOCKS | N ( =6 ) |
|---|---|

IMAGE PROCESSING SYSTEM AND IMAGE PROCESSING METHOD

FIELD OF THE INVENTION

The present invention relates to an image processing system and image processing method, which convert image information scanned by an image processing apparatus such as a copying machine or the like into vector data that can be re-used by a document creation application software.

BACKGROUND OF THE INVENTION

In recent years, some digital multifunction peripherals (MFPs) having extended functions scan paper documents which have conventionally been bound by and stored in a binder or the like using a scanner, convert the scanned image information into vector data and store the vector data in an image storage device, and make it possible to re-use the stored data on an application of a computer.

For example, there is known an MFP which recognizes character information included in image data obtained by scanning a document and associates it with font data (e.g., Japanese Patent Laid-Open No. 5-12402). This arrangement facilitates re-use and re-editing of a paper document and the like.

However, reusability as vector data may pose a problem. More specifically, information contained in an original document may purposely be tampered or copyrighted data theft may easily be done.

SUMMARY OF THE INVENTION

The present invention has been proposed to solve the conventional problems, and has as its objects to provide an image processing system and image processing method which can appropriately set whether to convert an original paper document into re-usable vector data before obtaining vector data from the paper document.

In order to solve the problems, according to the present invention, there is provided an image processing system comprising scanning means for scanning a document to obtain image information, storage means for storing the image information, vectorization means for vectorizing the image information, detection means for detecting control information appended to the document from the image information, determination means for determining on the basis of the control information whether vectorization of the image information is permitted or inhibited and control means for causing the vectorization means to convert the image information into vector data if the determination means determines that vectorization of the image information is permitted, and directly storing the image information in the storage means if the determination means determines that vectorization of the image information is inhibited.

In order to solve the problems, according to the present invention, there is provided an image processing system comprising scanning means for scanning a document to obtain image information, storage means for storing the image information, vectorization means for vectorizing the image information, character recognition means for executing character code conversion for the image information, image conversion means for converting the image information into a predetermined image format, conversion means for converting the image information using at least one of the vectorization means, character recognition means, and image conversion means, detection means for detecting control information appended to the document from the image information, determination means for determining on the basis of the control information whether conversion of the image information is permitted or inhibited and control means for causing the conversion means to convert the image information if the determination means determines that vectorization of the image information is permitted, and directly storing the image information in the storage means if the determination means determines that vectorization of the image information is inhibited.

In order to solve the problems, according to the present invention, there is provided an image processing system comprising scanning means for scanning a document to obtain image information, setting means for setting, for the image information, control information for controlling vectorization, appending means for appending the set control information to the image information and forming means for forming the image information appended with the control information on a predetermined medium.

In order to solve the problems, according to the present invention, there is provided an image processing method comprising a scanning step of scanning a document to obtain image information, a storage step of storing the image information in storage means, a vectorization step of vectorizing the image information, a detection step of detecting control information appended to the document from the image information, a determination step of determining on the basis of the control information whether vectorization of the image information is permitted or inhibited and a control step of converting the image information into vector data in the vectorization step if it is determined in the determination step that vectorization of the image information is permitted, and directly storing the image information in the storage means in the storage step if it is determined in the determination step that vectorization of the image information is inhibited.

In order to solve the problems, according to the present invention, there is provided an image processing method comprising a scanning step of scanning a document to obtain image information, a storage step of storing the image information in storage means, a vectorization step of vectorizing the image information, a character recognition step of executing character code conversion for the image information, an image conversion step of converting the image information into a predetermined image format, a conversion step of converting the image information using at least one of the vectorization step, character recognition step, and image conversion step, a detection step of detecting control information appended to the document from the image information, a determination step of determining on the basis of the control information whether conversion of the image information is permitted or inhibited and a control step of converting the image information in the conversion step if it is determined in the determination step that vectorization of the image information is permitted, and directly storing the image information in the storage means in the storage step if it is determined in the determination step that vectorization of the image information is inhibited.

In order to solve the problems, according to the present invention, there is provided an image processing method comprising a scanning step of scanning a document to obtain image information, a setting step of setting, for the image information, control information for controlling vectorization, an appending step of appending the set control information to the image information and a forming step of forming the image information appended with the control information on a predetermined medium.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principle of the invention.

FIG. 5 is a view showing an example of the block information for the blocks obtained in the block selection process;

DETAILED DESCRIPTION OF THE PREFERRED EMBODIMENTS

An image processing system and image processing method according to preferred embodiments of the present invention will be described below with reference to the drawings.

First Embodiment

Figure 1:
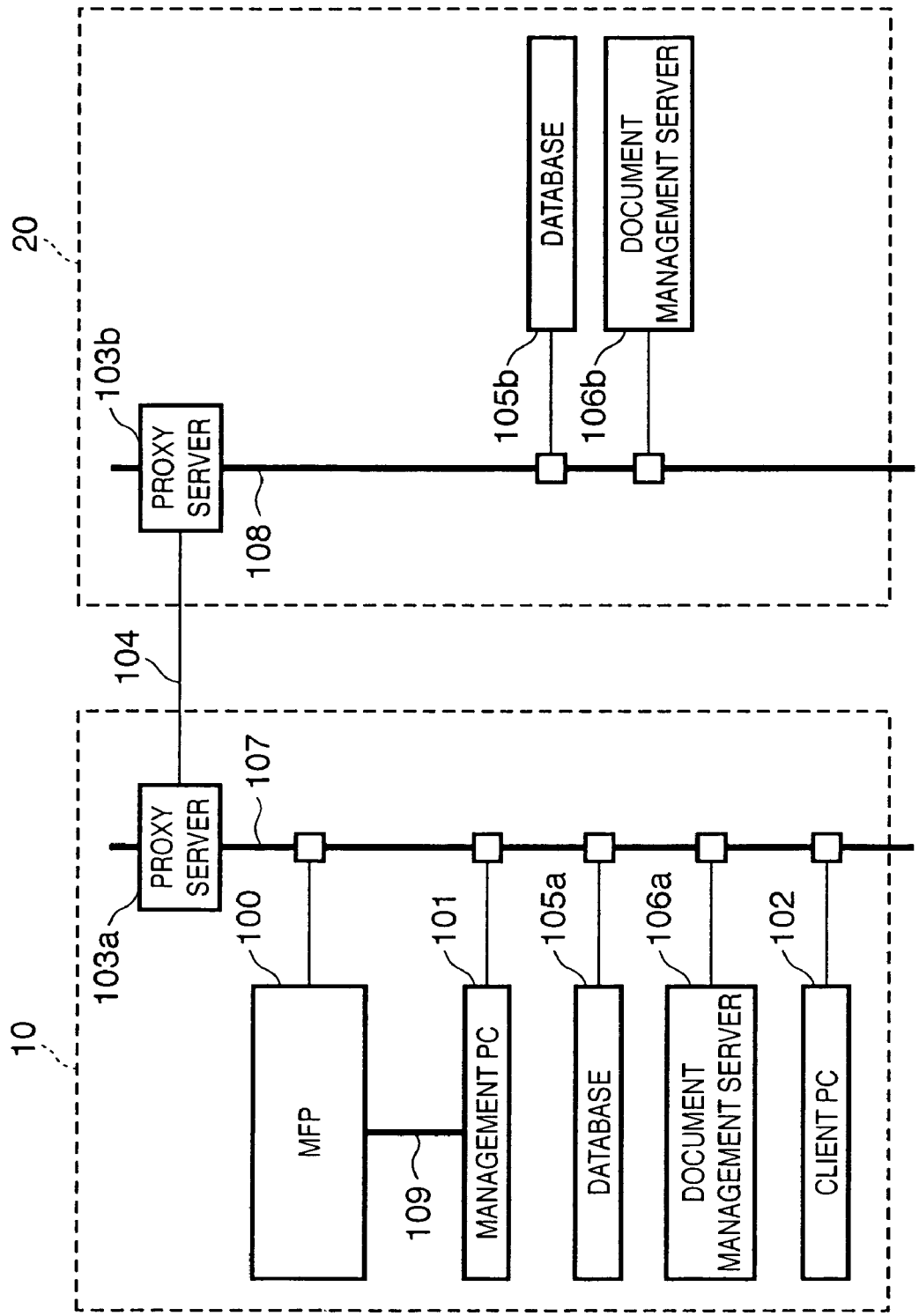
FIG. 1 is a block diagram showing the arrangement of an image processing system according to the first embodiment of the present invention.

FIG. 1 is a block diagram showing the arrangement of an image processing system according to the first embodiment of the present invention. The image processing system in FIG. 1 is implemented in an environment in which offices 10 and 20 are connected via a network 104 such as the Internet.

To a LAN 107 formed in the office 10, an MFP 100, a management PC 101 for controlling the MFP 100, a client PC 102, a document management server 106a, its database 105a, and a proxy server 103a are connected. To a LAN 108 formed in the office 20, a document management server 106b, its database 105b, and a proxy server 103b are connected. Note that the client PC 102 comprises an external storage unit, search image input unit, and search result output unit. The LAN 107 and the LAN 108 in the office 20 are connected to the network 104 such as the Internet via the proxy servers 103a and 103b.

The MFP 100 has charge of an image scanning process of optically scanning a paper document and converting it into an image signal and some of image processes for the scanned image signal in this embodiment, and supplies an image signal to the management PC 101 via a LAN 109. The management PC 101 can be implemented by a general PC, which incorporates an image storage unit, image processing unit, display, input unit, and the like. Some or all of the components of the management PC 101 may be integrally formed with the MFP 100.

Figure 2:
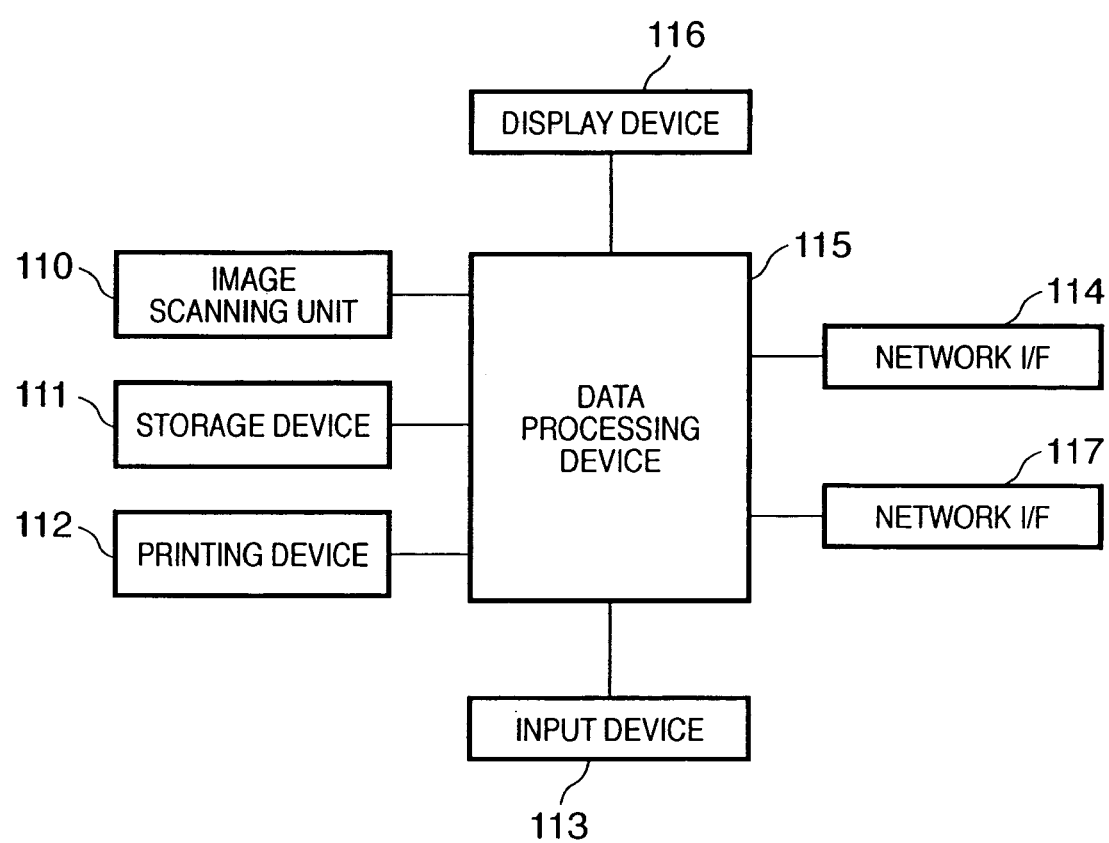
FIG. 2 is a block diagram showing the arrangement of an MFP 100 according to the first embodiment of the present invention.

FIG. 2 is a block diagram showing the arrangement of the MFP 100 according to the first embodiment of the present invention. Referring to FIG. 2, an image scanning unit 110 including an auto document feeder (to be abbreviated as an "ADF" hereinafter) irradiates a document image on one or a plurality of stacked documents with light coming from an internal light source, forms an image of light reflected by the document on a solid-state image sensing element via a lens, and obtains a scanned image signal in the raster order as image information at a resolution of, e.g., 600 dpi, from the solid-state image sensing element. In a normal copy function, a data processing device 115 executes an image process of that image signal to convert it into a recording signal. In the case of a multi-copy process, the data processing device 115 temporarily stores recording data of one page in a storage device 111, and sequentially outputs that data to a printing device 112, thus printing images on paper sheets.

Print data output from the client PC 102 is input to the MFP 100 via the LAN 107, is received by the data processing device 115 via a network I/F 114, and is then converted into recordable raster data by the data processing device 115. The raster data is then output to the printing device 112 to print a recording image on a paper sheet.

The operator inputs instructions to the MFP using an input device 113 such as a key equipped on the MFP, or an input device of the management PC 101 which includes a keyboard and mouse. Such series of operations are controlled by a controller in the data processing device 115.

A display device 116 of the MFP 100, the monitor of the management PC 101, or the monitor of the client PC 102 displays status of operation inputs and image data whose process is underway. Note that the storage device 111 is also controlled from the management PC 101, and data exchange and control between the MFP 100 and the management PC 101 are done via a network I/F 117 and the directly connected LAN 109.

[Overview of Scanning Process]

Figure 3:
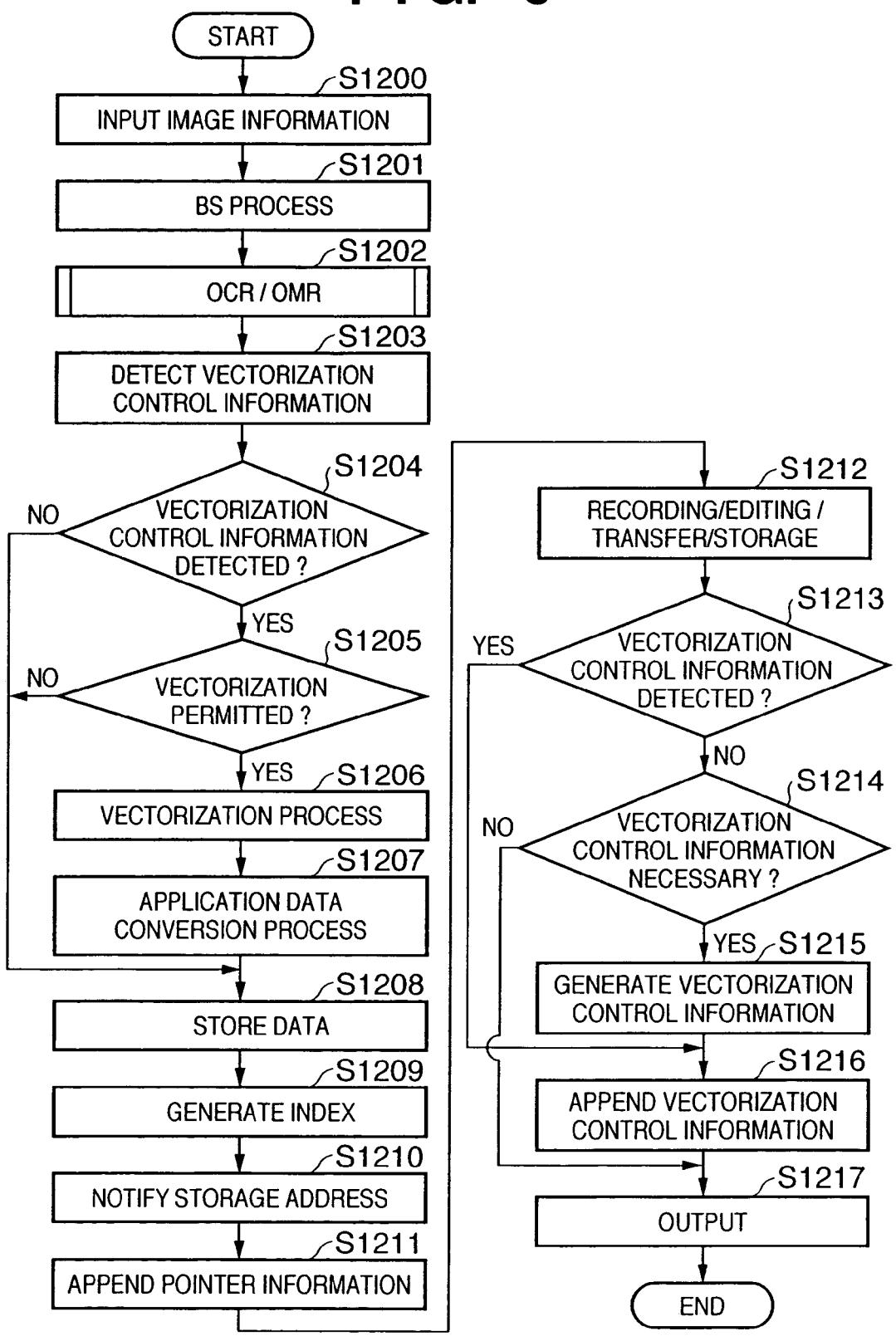
FIG. 3 is a flowchart for explaining the procedure for an image process by the image processing system according to the first embodiment of the present invention.

An overview of the entire image process by the image processing system according to the first embodiment of the present invention will be described below. FIG. 3 is a flowchart for explaining the procedure for an image process by the image processing system according to the first embodiment of the present invention. A process of scanning a paper document to obtain image information will be described with reference to the flowchart in FIG. 3.

The image scanning unit 110 of the MFP 100 is enabled to raster-scan one original and to obtain, e.g., a 8-bit image signal of a 600 dpi (image information input process: step S1200). This image signal undergoes a pre-process by the data processing device 115, and is stored as image data of one page in the storage device 111.

A CPU of the management PC 101 separates regions of a text/line image part and halftone image part from the image signal stored in the storage device 111. The CPU further separates a text part into blocks combined as clusters for respective paragraphs and a line image part into tables and graphics formed of lines, and converts these blocks, tables, and graphics into segments. On the other hand, the CPU segments the image part expressed by halftone into independent objects for respective so-called blocks (e.g., a rectangular image part block, background part block, and the like) (block selection (BS) process: step S1201).

At this time, a two-dimensional barcode or an object corresponding to URL, which is recorded in the document image as additional information, is detected. In this case, the URL undergoes character recognition in an OCR (optical character recognition) process, and the two-dimensional barcode or object is decoded (step S1202). Vectorization control information of the document is detected from the decoding result (step S1203). The vectorization control information represents inhibition or permission of vectorization for each of objects of a document, each of object types, or a specific object. As a method of appending pointer information, a method of using a digital watermark to embed information imperceptible to the human eye such as a method of embedding information between neighboring characters by modulating the spacings between them at a plurality of positions, a method of embedding information of a specific frequency in a halftone image, or the like may be adopted. If the additional information is embedded as a digital watermark, the watermark information is detected and is decoded in step S1202. As described above, the vectorization control information may have any format as far as it can attain the objects of this embodiment.

After the vectorization control information detection process, the flow branches to step S1204. If it is determined in step S1204 that the input image information has no vectorization control information (NO), the image information is directly stored in the storage device 111 (step S1208). On the other hand, if any vectorization control information is found in step S1204 (YES), the flow branches to step S1205.

It is determined in step S1205 on the basis of the vectorization control information whether vectorization is permitted. If it is determined that vectorization is permitted (YES), the image information is vectorized (step S1206).

The process in step S1206 comprises conversion of image information into vector data and converts the image information into an electronic file close to the original electronic file. For text blocks that have undergone the OCR process in step S1202, the size, style, and font of characters are further recognized to convert the text blocks into font data which are visually faithful to characters obtained by scanning the document. Also, table and graphic blocks formed of lines are converted into outline data.

Image blocks are processed as an independent JPEG file as image data. Such vectorization processes are executed for respective objects, and layout information of the objects is saved. These objects and layout information are converted into application data such as an rtf file (step S1207), and the application data is stored in the storage device 111 as an electronic file (step S1208).

If it is determined in step S1205 that vectorization is inhibited (NO), the flow branches to step S1208 to directly store the image information as an electronic file in the storage device 111. This direct storage of the image information in the storage device 111 prevents text data in the image information from being tampered by application software or prevents the image information from being manipulated as graphic data. Thus, the original information can directly be stored. That is, data obtained by scanning a paper document and formed in a format which cannot be re-used can directly be stored.

In order to allow a direct search process for various kinds of image information including vector data and font data obtained from the document image stored in step S1208 as an electronic file upon executing a similar process, index information for such search process is generated and is added to a search index file (step S1209). The operator is notified of the storage address of the electronic file (step S1210), and pointer information indicating the storage address is appended to the file as image information (step S1211).

For example, a document recording, editing, transfer, and storage processes can be executed using an electronic file itself obtained by the procedure for the above-mentioned processes to step S1211 (step S1212).

[Image Output Process]

In FIG. 3, the processes from step S1213 indicate the procedure for an image output process of reading out and outputting an electronic file obtained by the processes to step S1212 as vectorized data or image data from the storage device 111.

A CPU (not shown) reads out an image which is stored in the storage device 111 of the MFP 100 as an electronic file from a stored image signal and converts the image into recordable raster data in the data processing device 115. It is determined in step S1213 whether any vectorization control information is detected. If any vectorization control information is detected (YES), the vectorization control information is appended (step S1216).

On the other hand, if no vectorization control information is detected (NO), a condition set by the operator as to whether to execute vectorization control is further determined (step S1214). If vectorization control is necessary (YES), vectorization control information is generated (step S1215), and the generated vectorization control information is appended (step S1216). In step S1217, the image, which has been converted into vector data, is printed and output from the printing device 112 on a medium such as a paper sheet or the like.

Vectorization control information detected in this embodiment makes it possible to control input image information on the basis of the permission/inhibition of re-use and implement an image processing system having more improved maintainability of input image information than a conventional one.

Note that in this embodiment, vectorization is executed when it is determined in step S1204 that an input has no vectorization control information. However, without any vectorization control information, control may be executed so as to skip vectorization. Either arrangement to select depends on to which to give priority, the convenience of vectorization or the security or copyright of an original document. The image processing system may be arranged such that the operator can arbitrarily select either one.

The processing blocks will be described in detail below.

The block selection (BS) process indicated by step S1201 will be described first.

[Block Selection Process]

Figure 4:
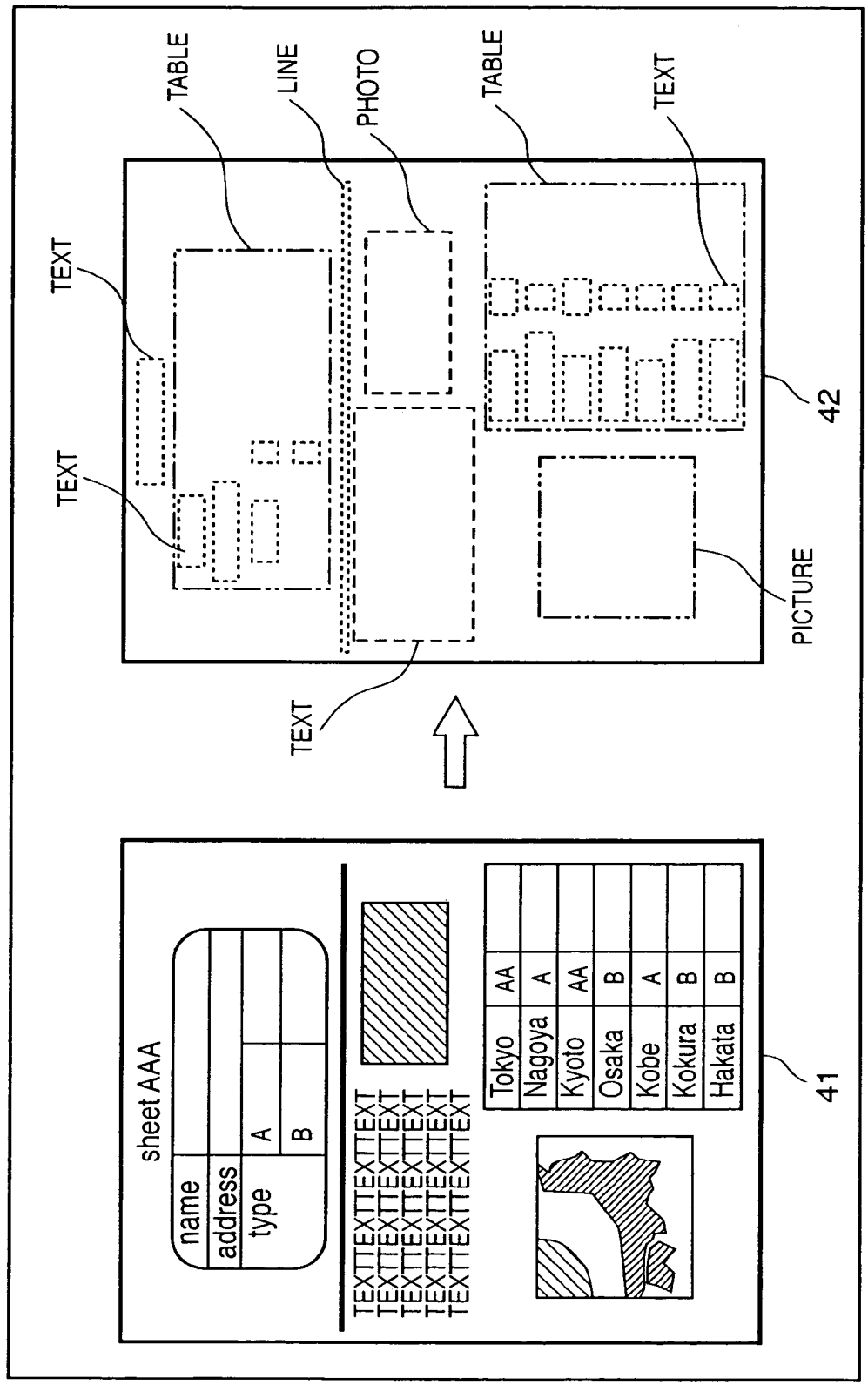
FIG. 4 is a view showing how a block selection process determines the property of one scanned image data and divides the image data into a plurality of blocks.

FIG. 4 is a view showing how a block selection process determines the property of one scanned image data and divides the image data into a plurality of blocks. More specifically, in the block selection process, image data of one page scanned in step S1200 indicated by reference numeral 41 is recognized as clusters for respective objects (as indicated by reference numeral 42), properties such as text (TEXT), photo (PHOTO), line (LINE), table (TABLE), and the like of respective blocks are determined, and the image data is segmented into regions (blocks) having different properties.

One example of the block selection process will be described below.

An input image is binarized to a monochrome image, and a cluster of pixels bounded by an outline of black pixels is extracted by outline tracing of black pixels. For a cluster of black pixels with a large area, outline tracing is also made for white pixels in the cluster to extract clusters of white pixels. Furthermore, a cluster of black pixels is recursively extracted from the cluster of white pixels with a predetermined area or more. The above-mentioned process is executed for a document on which black characters and the like are printed on a white background. In the case of other documents, the process can similarly be made by setting a color corresponding to the background as "white" and that corresponding to an object as "black".

The obtained clusters of black pixels are classified into regions having different properties in accordance with their sizes and shapes. For example, a pixel cluster which has an aspect ratio close to 1, and has a size that falls within a predetermined range is determined as that corresponding to a character. Furthermore, a part where neighboring characters regularly line up and can be grouped is determined as a text region. Also, a flat pixel cluster is categorized as a line region, a range occupied by black pixel clusters that include rectangular white pixel clusters which have a predetermined size or more and regularly line up is categorized as a table region, a region where pixel clusters with indeterminate forms are distributed is categorized as a photo region, and any other pixel cluster with an arbitrary shape is categorized as a picture region, and so forth. This makes it possible to set a more advanced limit on the re-use of electronic data obtained by scanning a one-page document.

FIG. 5 is a view showing an example of the block information for the blocks obtained in the block selection process. These pieces of information for respective blocks shown in FIG. 5 are used to execute vectorization, as will be described later.

[Detection of Vectorization Control Information from Image Data]

The OCR/OMR process (indicated by step S1202) of extracting vectorization control information from scanned image data will be described first.

Figure 6:
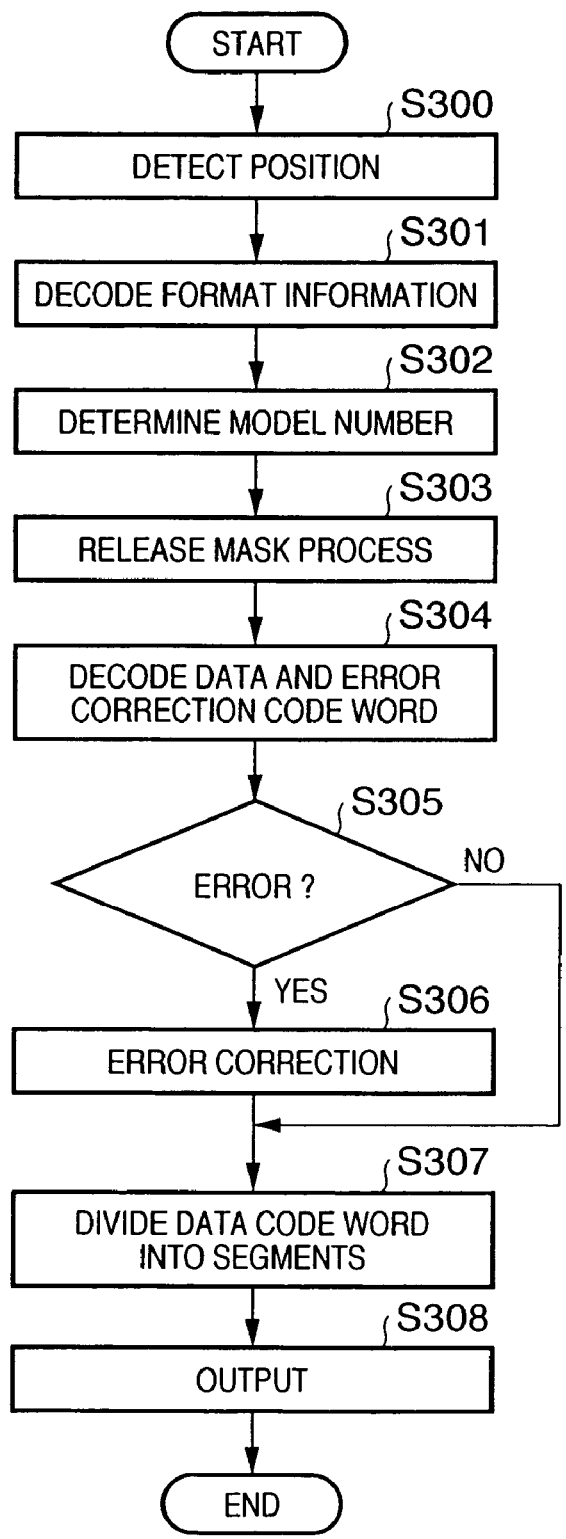
FIG. 6 is a flowchart for explaining the procedure for decoding a two-dimensional barcode (QR code symbol) appended into a document image and outputting a data character string.
Figure 7:
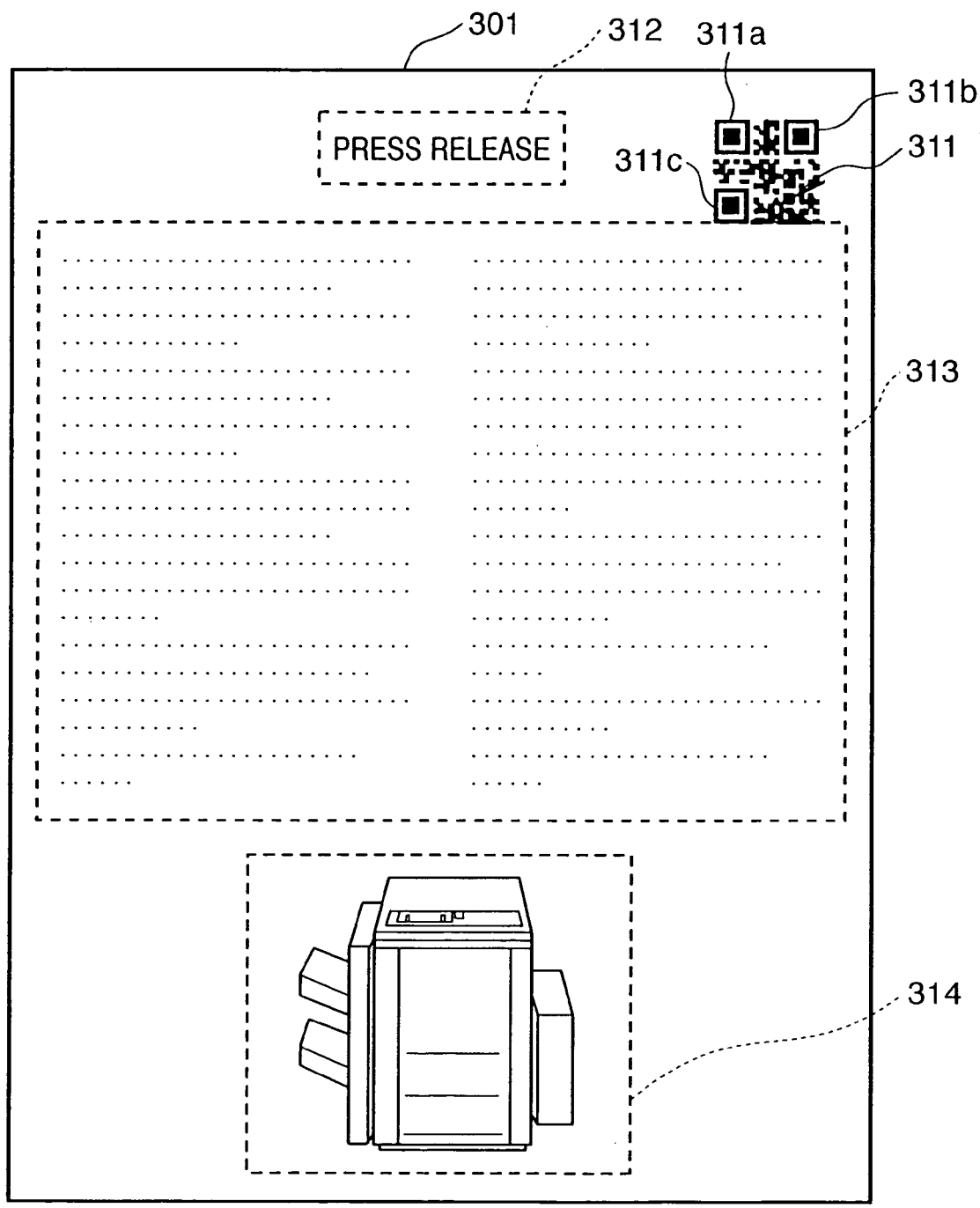
FIG. 7 is a view showing an example of a document 310 appended with a two-dimensional barcode.

FIG. 6 is a flowchart for explaining the procedure for decoding a two-dimensional barcode (QR code symbol) appended into a document image and outputting a data character string. FIG. 7 is a view showing an example of a document 310 appended with a two-dimensional barcode.

The internal CPU scans image data which is stored in a page memory in the data processing device 115 and is obtained by scanning the document 310 to detect the position of a predetermined two-dimensional barcode symbol 311 from the result of the above-mentioned block selection process. A position detection pattern of a QR code is made up of identical position detection element patterns 311a to 311c, which are located at three out of the four corners of the symbol (step S300).

Next, format information that neighbors the position detection pattern is decoded to obtain an error correction level and mask pattern applied to the symbol (step S301). After a model number of the symbol is determined (step S302), an encoded region bit pattern is XORed using the mask pattern obtained from the format information to cancel the mask process (step S303).

A symbol character is read in accordance with the layout rule corresponding to the model so as to decode message data and an error correction code word (step S304). It is detected if a decoded code includes an error (step S305). As a result, if any error is detected (YES), that error is corrected (step S306). A data code word is divided into segments on the basis of a mode indicator and character count indicator from the error-corrected data (step S307). Finally, data characters are decoded on the basis of a specification mode, thus outputting the result (step S308). If no error is detected in step S305 (NO), the flow advances to step S307.

Data to be encoded in the two-dimensional barcode represents vectorization control information.

In this embodiment, the document 310 appended with the vectorization control information using the two-dimensional barcode has been exemplified. Alternatively, vectorization control information may be recorded using a character string. In this case, a block of a character string according to a predetermined rule is detected by the above block selection process, and characters of the character string that indicates the pointer information undergo character recognition, thus directly obtaining the vectorization control information.

Furthermore, vectorization control information can be assigned by embedding watermark information in the character spacings by applying imperceptible modulation to, e.g., the spacings between neighboring characters in a character string of a text block 312 or 313 of the document 310 shown in FIG. 7. When such watermark information is used, vectorization control information can be acquired by detecting the character spacings upon executing a character recognition process (to be described later). Also, vectorization control information can be assigned as a digital watermark in a natural image block 314.

[Vectorization Process]

The vectorization process indicated by step S1206 in FIG. 3 will be described below. A character recognition process is executed for each character of text blocks.

<<Character Recognition>>

In a character recognition process according to this embodiment, an image extracted for each character is recognized using one of pattern matching methods to obtain a corresponding character code. In this recognition process, an observation feature vector obtained by converting a feature acquired from a character image into a several-ten-dimensional numerical value string is compared with a dictionary feature vector obtained in advance for each character type, and a character type with a shortest distance is output as a recognition result. Various known methods are available for feature vector extraction. For example, a method of dividing a character into a mesh pattern, and counting character lines in respective meshes as line elements depending on their directions to obtain a (mesh count)-dimensional vector as a feature can be adopted.

When a text region extracted by the block selection process (step S1201) undergoes character recognition, the writing direction (horizontal or vertical) is determined for that region, lines are extracted in the corresponding directions, and character images are then obtained by extracting characters. Upon determining the writing direction (horizontal or vertical), horizontal and vertical projections of pixel values in that region are calculated, and if the variance of the horizontal projection is larger than that of the vertical projection, that region can be determined as a horizontal writing region; otherwise, that region can be determined as a vertical writing region.

Upon decomposition into character strings and characters, in the case of horizontal writing, lines are extracted using the horizontal projection, and characters are extracted based on the vertical projection for the extracted line. In the case of a vertical writing text region, the relationship between the horizontal and vertical parameters may be exchanged. Note that a character size can be detected based on the extracted size.

<<Font Recognition>>

A plurality of sets of dictionary feature vectors for the number of character types used in character recognition are prepared in correspondence with character shape types, i.e., font types, and a font type is output together with a character code upon matching, thus recognizing the font of a character.

<<Vectorization of Character>>

In this embodiment, as for character vectorization, information of a character part is converted into vector data, using a character code and font information obtained by the character recognition process, and outline data prepared in advance. If an original document is a color document, the color of each character is extracted from the color image and is recorded together with vector data.

With the above processes, image information which belongs to a text block can be converted into vector data with a nearly faithful shape, size, and color. This makes it possible to handle high-quality text data.

<<Vectorization of Non-text Part>>

For a region which is determined as a graphic or line, or table region by the block selection process in step S1201, outlines of pixel clusters extracted in each region of interest are converted into vector data. More specifically, a point sequence of pixels which form an outline is divided into sections at a point which is considered as a corner, and each section is approximated by a partial line or curve. Note that "corner" means a point corresponding to a maximal curvature.

Figure 8:
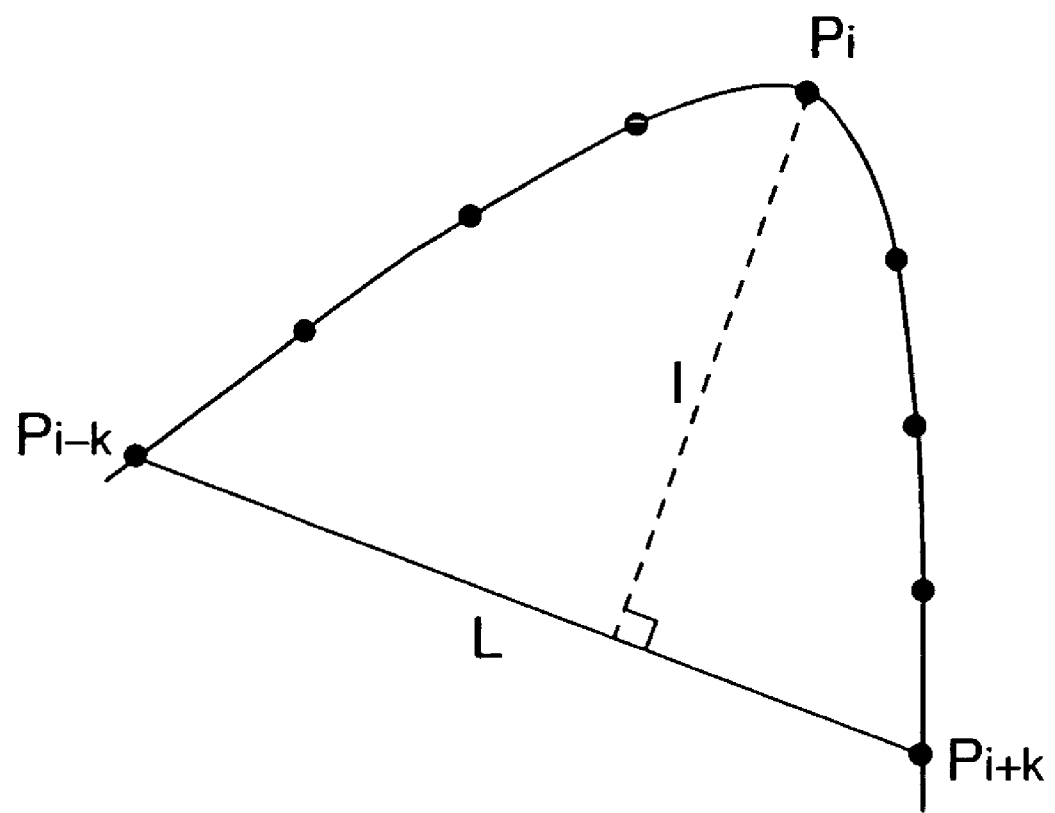
FIG. 8 is a view for explaining a point corresponding to a maximal curvature.

FIG. 8 is a view for explaining a point corresponding to a maximal curvature. As shown in FIG. 8, the point corresponding to the maximal curvature is obtained as a point where the distance between an arbitrary point Pi and a chord which is drawn between points Pi−k and Pi+k separated k points from the point Pi in the left and right directions becomes maximal. Furthermore, let R be the chord length/arc length between Pi−k and Pi+k. Then, a point where the value R is equal to or smaller than a threshold value can be considered as a corner. Sections obtained after division at each corner can be vectorized using a method of least squares or the like with respect to a point sequence for a line, and a ternary spline function or the like for a curve.

When an object has an inside outline, it is similarly approximated by a partial line or curve using a point sequence of a white pixel outline extracted by the block selection process.

As described above, using partial line approximation of outlines, an outline of a graphic with an arbitrary shape can be converted into vector data. When a document has a color image, the color of a graphic is extracted from the color image and is recorded together with vector data.

Figure 9:
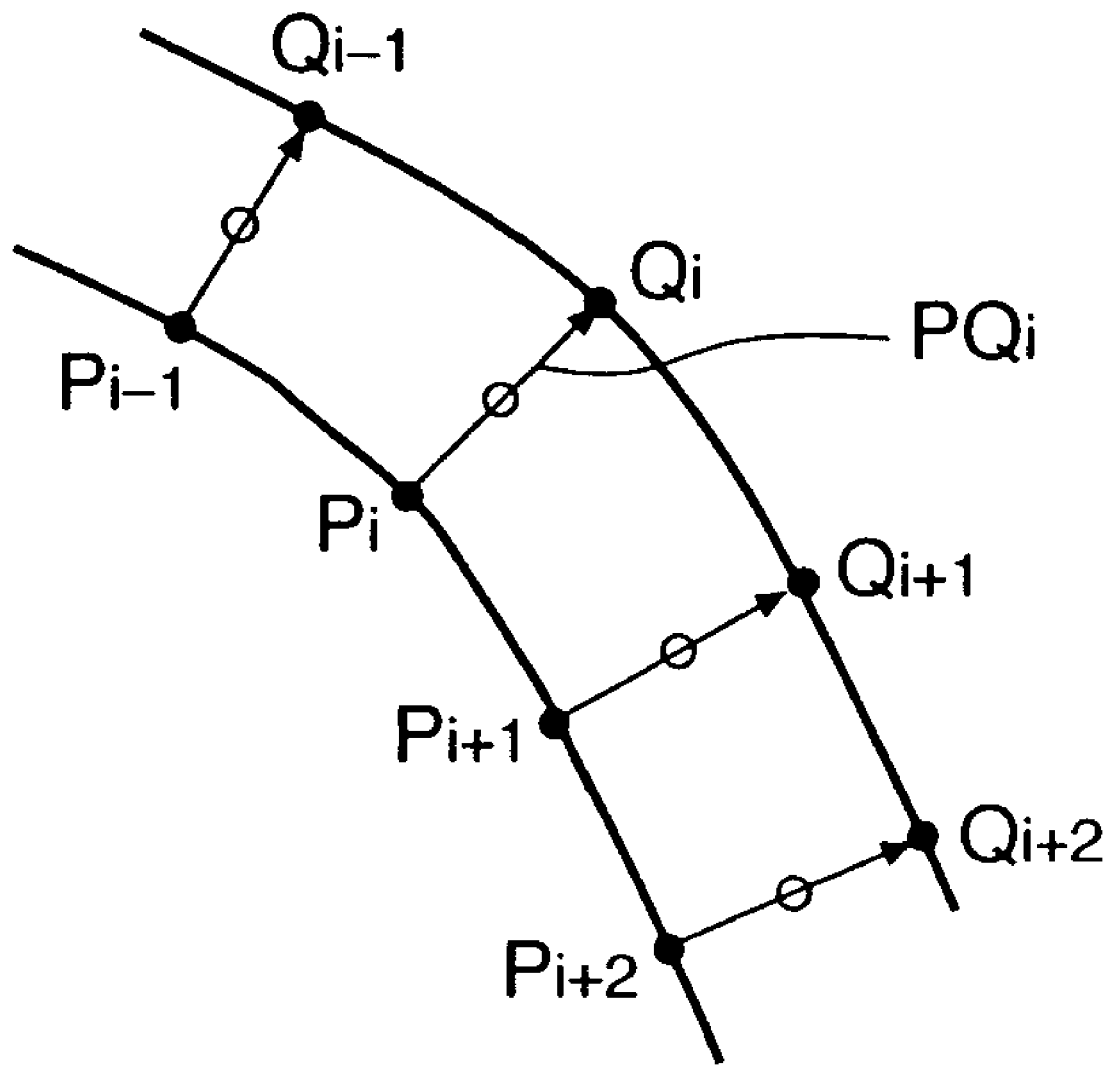
FIG. 9 is a view for explaining an example wherein an outside outline which is close to an inside outline or another outside outline is expressed as a line with a given width.

FIG. 9 is a view for explaining an example wherein an outside outline which is close to an inside outline or another outside outline is expressed as a line with a given width. When an outside outline is close to an inside outline or another outside outline in a given section, as shown in FIG. 9, two outlines may be combined to express a line with a given width. More specifically, lines are drawn from respective points Pi on a given outline to points Qi on another outline, each of which has a shortest distance from the corresponding point. When the distances PQi maintain a constant value or less on the average, the section of interest is approximated by a line or curve using PQi middle points as a point sequence, and the average value of the distances PQi is set as the width of that line or curve. A line or a table ruled line as a set of lines can be efficiently expressed as vector data as a set of lines having a given width, as described above.

As for vectorization using the character recognition process for a text block, a character which has the shortest distance from a dictionary as a result of the character recognition process is used as a recognition result, as described above. When this distance is equal to or larger than a predetermined value, the recognition result does not always match an original character, and a wrong character having a similar shape is often recognized. Therefore, in the present invention, such character is handled in the same manner as a general line art, as described above, and is converted into outline data. That is, even a character that causes a recognition error in the conventional character recognition process can be prevented from being vectorized to a wrong character, but can be vectorized based on outline data which is visually faithful to image data. Also, a block determined as a photo block is not vectorized in the present invention, and is output as image data without any modification.

[Graphic Recognition]

A process for grouping vectorized partial lines for each graphic object after the outline of a graphic with an arbitrary shape is vectorized, as described above, will be described below.

Figure 10:
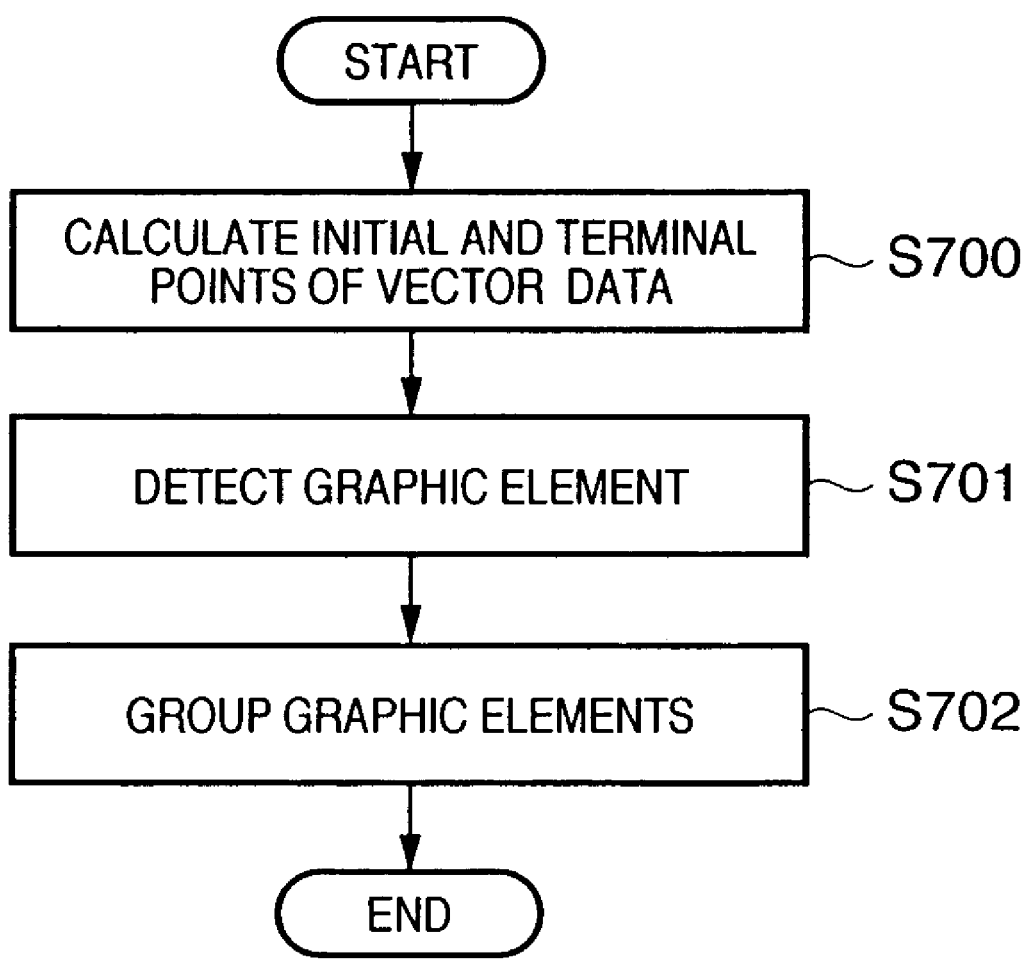
FIG. 10 is a flowchart for explaining the procedure for a process of grouping vector data for each graphic object.

FIG. 10 is a flowchart for explaining the procedure for a process executed until vector data are grouped for each graphic object. Initial and terminal points of each vector data are calculated (step S700). Using the initial point information and terminal point information of respective vectors, a graphic element is detected (step S701). Detecting a graphic element is to detect a closed graphic formed by partial lines.

Such detection is made by applying the principle that each vector which forms a closed shape has vectors coupled to its two ends.

Next, other graphic elements or partial lines present in the graphic element are grouped to set a single graphic object (step S702). If other graphic elements or partial lines are not present in the graphic element, that graphic element is set as a graphic object.

Figure 11:
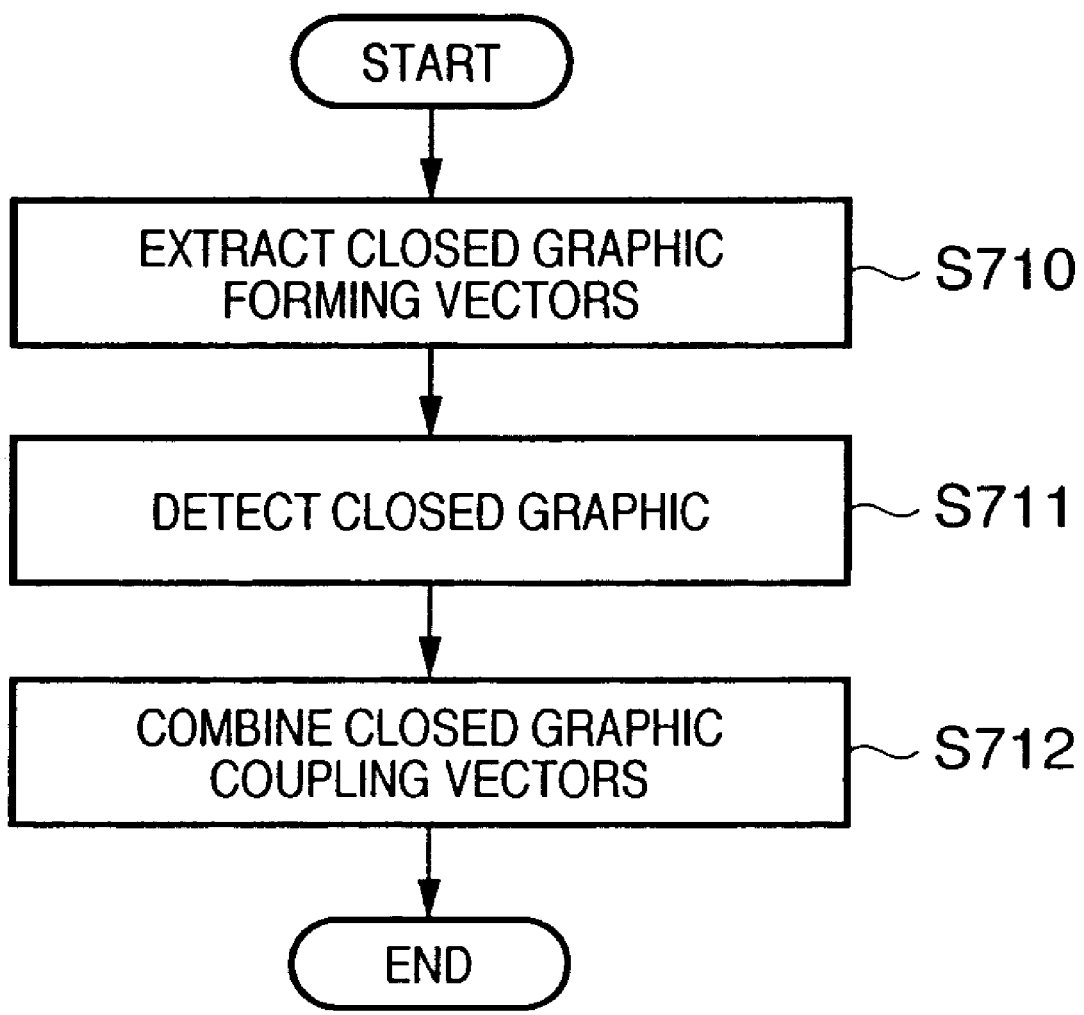
FIG. 11 is a flowchart for explaining the procedure for a process of detecting a graphic element.

FIG. 11 is a flowchart for explaining the procedure for a process of detecting a graphic element. Closed graphic forming vectors are extracted from vector data by excluding unwanted vectors, two ends of which are not coupled to other vectors (step S710). An initial point of a vector of interest of the closed graphic forming vectors is set as a start point, and vectors are traced clockwise in turn. This process is made until the start point is reached, and all passing vectors are grouped as a closed graphic that forms one graphic element (step S711). Also, all closed graphic forming vectors present in the closed graphic are grouped in-this case. Furthermore, an initial point of a vector which is not grouped yet is set as a start point, and the above process is repeated. Finally, of the unwanted vectors excluded in step S710, those which join the vectors grouped as the closed graphic in step S711 are detected and are grouped as one graphic element (step S712).

With the above-mentioned process, a graphic block can be handled as an independently re-usable graphic object.

[Conversion Process into Application Data]

Figure 12:
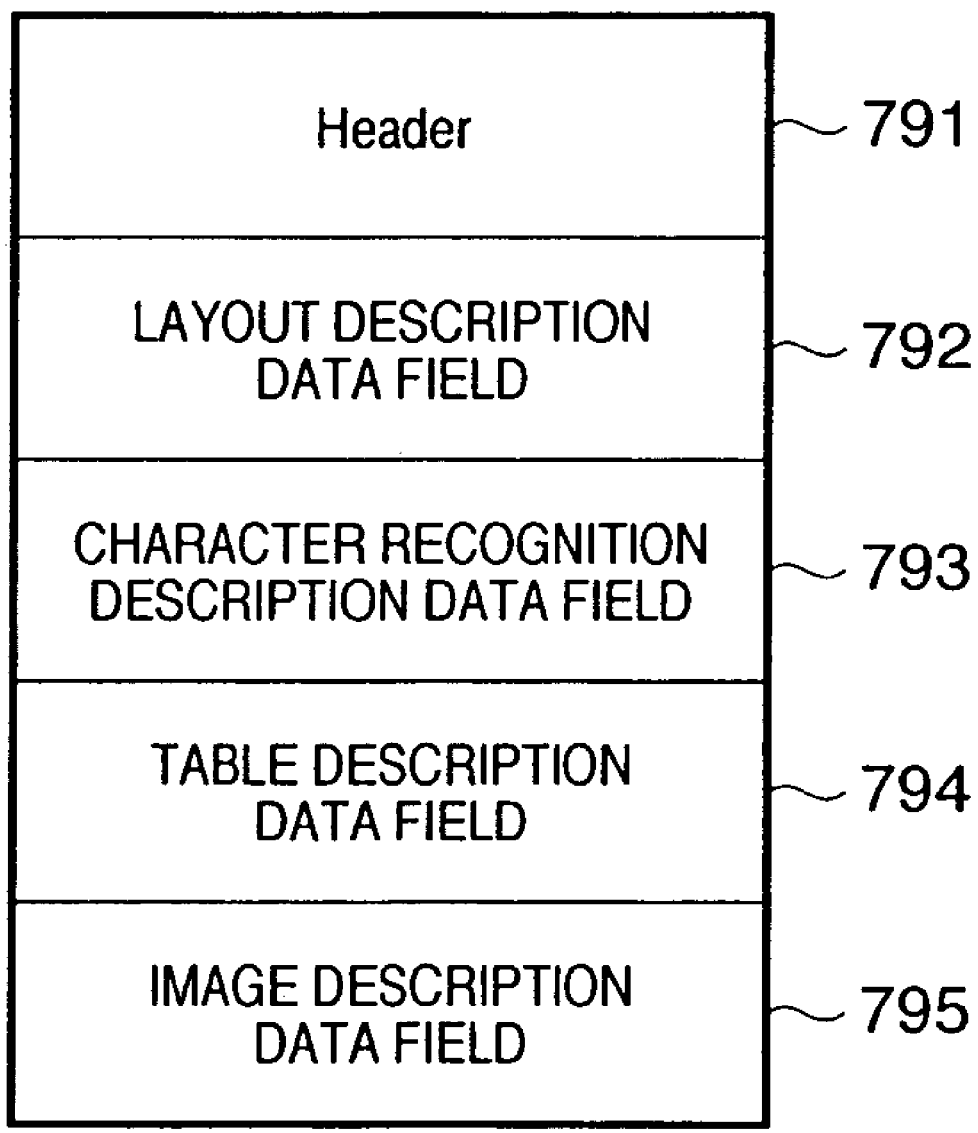
FIG. 12 is a view showing the data structure of a file in an intermediate data format obtained as a conversion result of the block selection process and a vectorization process for image data of one page.

FIG. 12 is a view showing the data structure of a file in an intermediate data format obtained as the conversion result of the block selection process (step S1201) and vectorization process (step S1206) for image data of one page. The data format shown in FIG. 12 is called a document analysis output format (DAOF) hereinafter. That is, FIG. 12 shows the DAOF data structure.

Referring to FIG. 12, reference numeral 791 denotes a Header which holds information associated with document image data to be processed. Reference numeral 792 denotes a layout description data field which holds property information and block address information of respective blocks which are recognized for respective properties such as TEXT (text), TITLE (title), CAPTION (caption), LINEART (line art), PICTURE (natural image), FRAME (frame), TABLE (table), and the like.

Reference numeral 793 denotes a character recognition description data field which holds character recognition results obtained by executing character recognition of TEXT blocks such as TEXT, TITLE, CAPTION, and the like. Reference numeral 794 denotes a table description data field which stores details of the structure of TABLE blocks. Reference numeral 795 denotes an image description data field which stores image data of PICTURE blocks, LINEART blocks, and the like extracted from the document image data.

Such DAOF data itself is often saved as a file in place of intermediate data. However, in the state of a file, a general document creation application cannot re-use individual objects. Hence, a process of converting the DAOF data into application data (step S1210) will be described in detail below.

Figure 13:
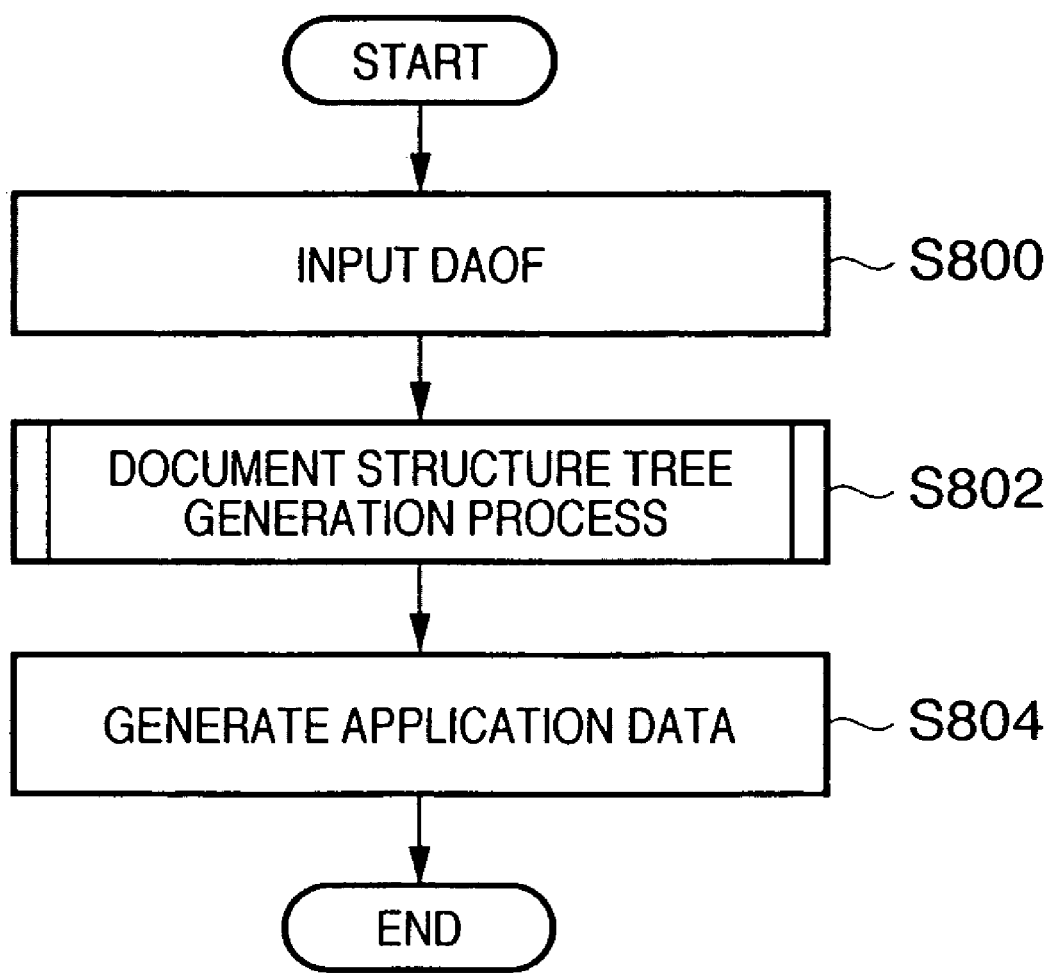
FIG. 13 is a flowchart for explaining the schematic procedure for the entire application data conversion process.

FIG. 13 is a flowchart for explaining the schematic procedure for the entire application data conversion process. DAOF data is input (step S800). A document structure tree which serves as a basis of application data is generated (step S802). Actual data in the DAOF are input based on the document structure tree, thus generating actual application data (step S804).

Figure 14:
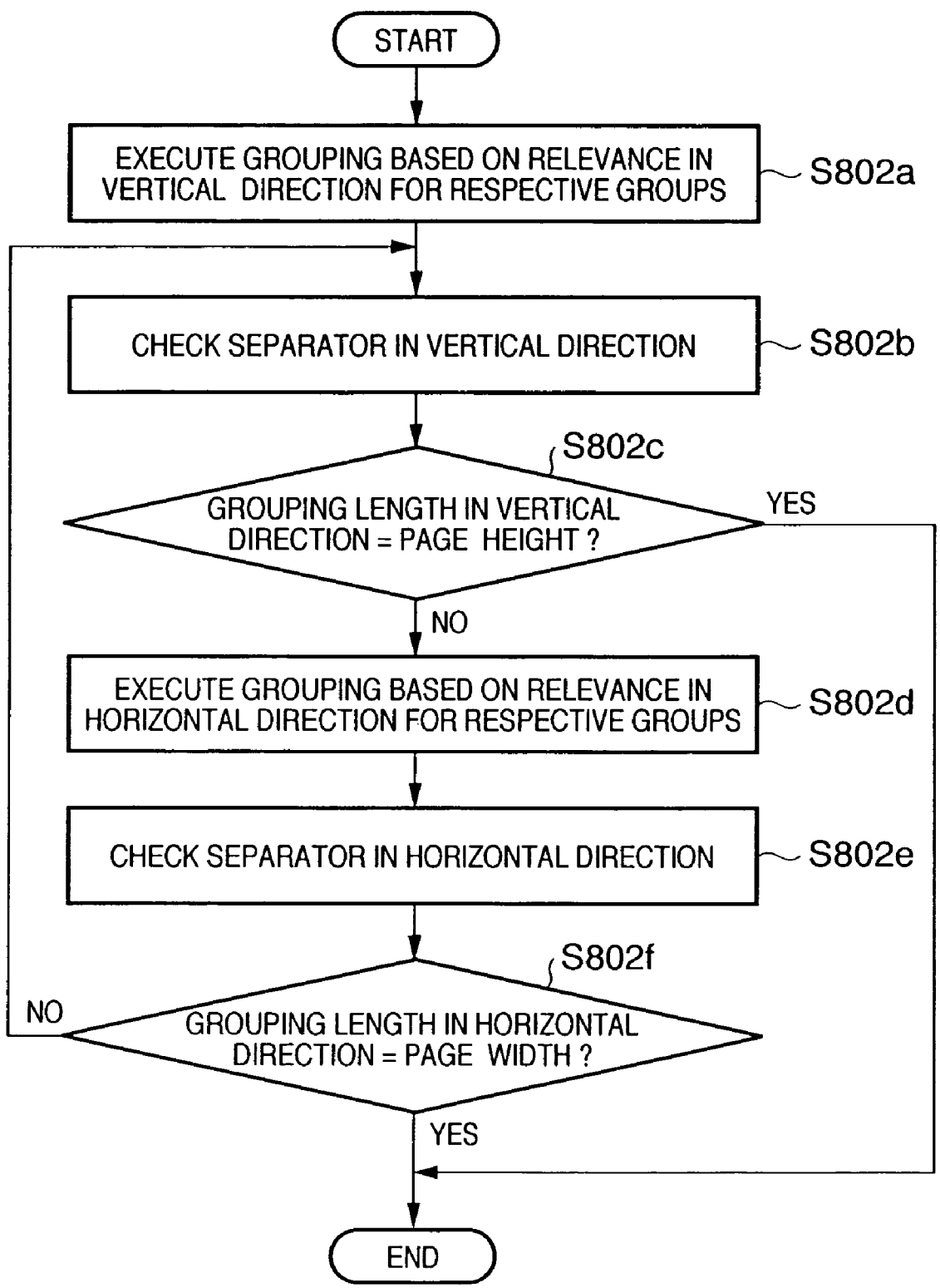
FIG. 14 is a flowchart for explaining the detailed procedure for a document structure tree generation process (step S802)
Figure 15A:
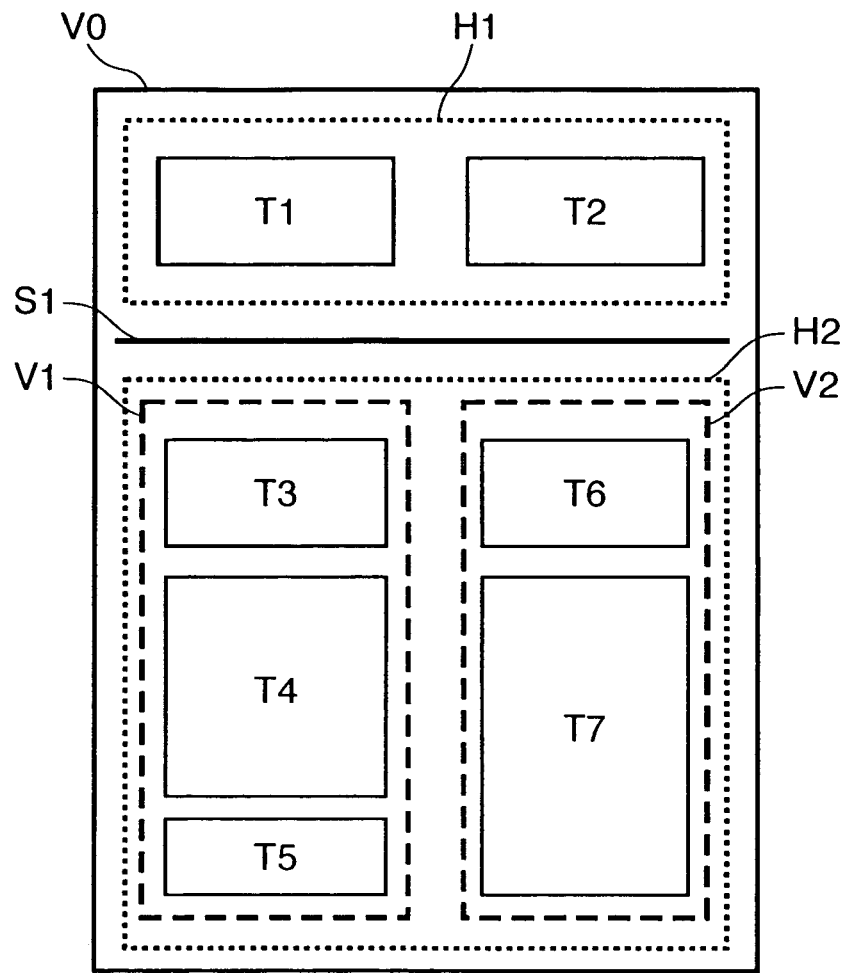
FIGS. 15A and 15B are views for explaining an overview of a document structure tree.
Figure 15B:
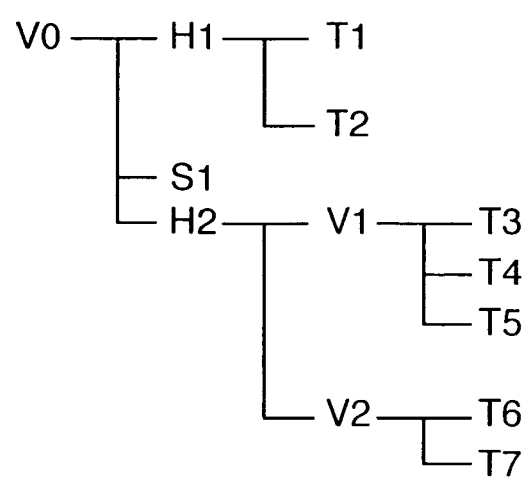

FIG. 14 is a flowchart for explaining the detailed procedure of a document structure tree generation process (step S802). FIGS. 15A and 15B are views for explaining an overview of a document structure tree. As a basic rule of the overall control, the flow of processes transits from a microblock (single block) to a macroblock (a set of blocks). In the following description, a block indicates a microblock and macroblock.

Re-grouping is done for respective blocks on the basis of relevance in the vertical direction (step S802$a$). Immediately after the flow starts, determination is made for respective microblocks. Note that relevance can be defined by checking if the distance between neighboring blocks is small, blocks have nearly the same block widths (heights in the case of the horizontal direction), and so forth. Information of the distances, widths, heights, and the like can be extracted with reference to the DAOF.

FIG. 15A shows an actual page configuration, and FIG. 15B shows a document structure tree of that page. As a result of grouping in step S802$a$, T3, T4, and T5 form one group V1, T6 and T7 form one group V2, and these groups are generated as those which belong to an identical layer.

The presence/absence of a vertical separator is checked (step S802$b$). Physically, a separator is an object which-has a line property in the DAOF. Logically, a separator is an element which explicitly divides blocks in an application. Upon detection of a separator, a group is re-divided in the identical layer.

It is then determined using a group length whether no more divisions are present (step S802$c$). For example, it is determined whether the grouping length in the vertical direction agrees with a page height. If the group length in the vertical direction agrees with the page height (YES), the document structure tree generation process ends. For example, in the case of the structure shown in FIGS. 15A and 15B, groups V1 and V2 have no separator, and their group height does not agree with the page height. Hence, NO is determined in step S802$c$, and the flow advances to step S802$d$.

In step S802$d$, re-grouping is done for respective blocks on the basis of relevance in the horizontal direction. Note that the first determination immediately after the flow starts is made for respective microblocks in this re-grouping. Definitions of relevance and its determination information are the same as those in the vertical direction. For example, in the case of the structure shown in FIGS. 15A and 15B, T1 and T2 generate group H1, and V1 and V2 generate group H2. Groups H1 and H2 are generated as those which belong to an identical layer one level higher than V1 and V2.

The presence/absence of a separator in the horizontal direction is checked (step S802$e$). Since FIGS. 15A and 15B include separator S1, that separator is registered in a tree, thus generating layers H1, S1, and H2. It is determined using a group length whether no more divisions are present (step S802$f$). For example, it is determined whether the grouping length in the horizontal direction agrees with a page width. As a result, if the group length in the horizontal direction agrees with the page width (YES), the document structure tree generation process ends. On the other hand, if the group length in the horizontal direction does not agree with the page width (NO), the flow returns to step S802$b$ to repeat the processes from relevance check in the vertical direction in an upper layer by one level. For example, in the case of the structure shown in FIGS. 15A and 15B, since the group length agrees with the page width, the process ends, and uppermost layer V0 that represents the entire page is finally appended to the document structure tree.

After the document structure tree is completed, application data is generated based on that information in step S804. A practical example in the case of the structure shown in FIGS. 15A and 15B will be explained below.

That is, since H1 includes two blocks T1 and T2 in the horizontal direction, it is output as two columns. After internal information of T1 (with reference to the DAOF, text as the character recognition result, image, and the like) is output, a new column is set, and internal information of T2 is output. After that, separator S1 is output. Since H2 includes two blocks V1 and V2 in the horizontal direction, it is output as two columns. Internal information of V1 is output in the order of T3, T4, and T5, and a new column is set. Then, internal information of V2 is output in the order of T6 and T7. In this manner, the conversion process into application data can be done. This makes it possible to re-use a vectorized object in existing document creation application software or the like.

[Generation/Appending of Vectorization Control Information]

A vectorization control information generation/appending process in steps S1215 and S1216 will be described in detail below. The vectorization control information generation/appending process is executed immediately before printing an image on a recording medium such as a paper sheet or the like.

Figure 16:
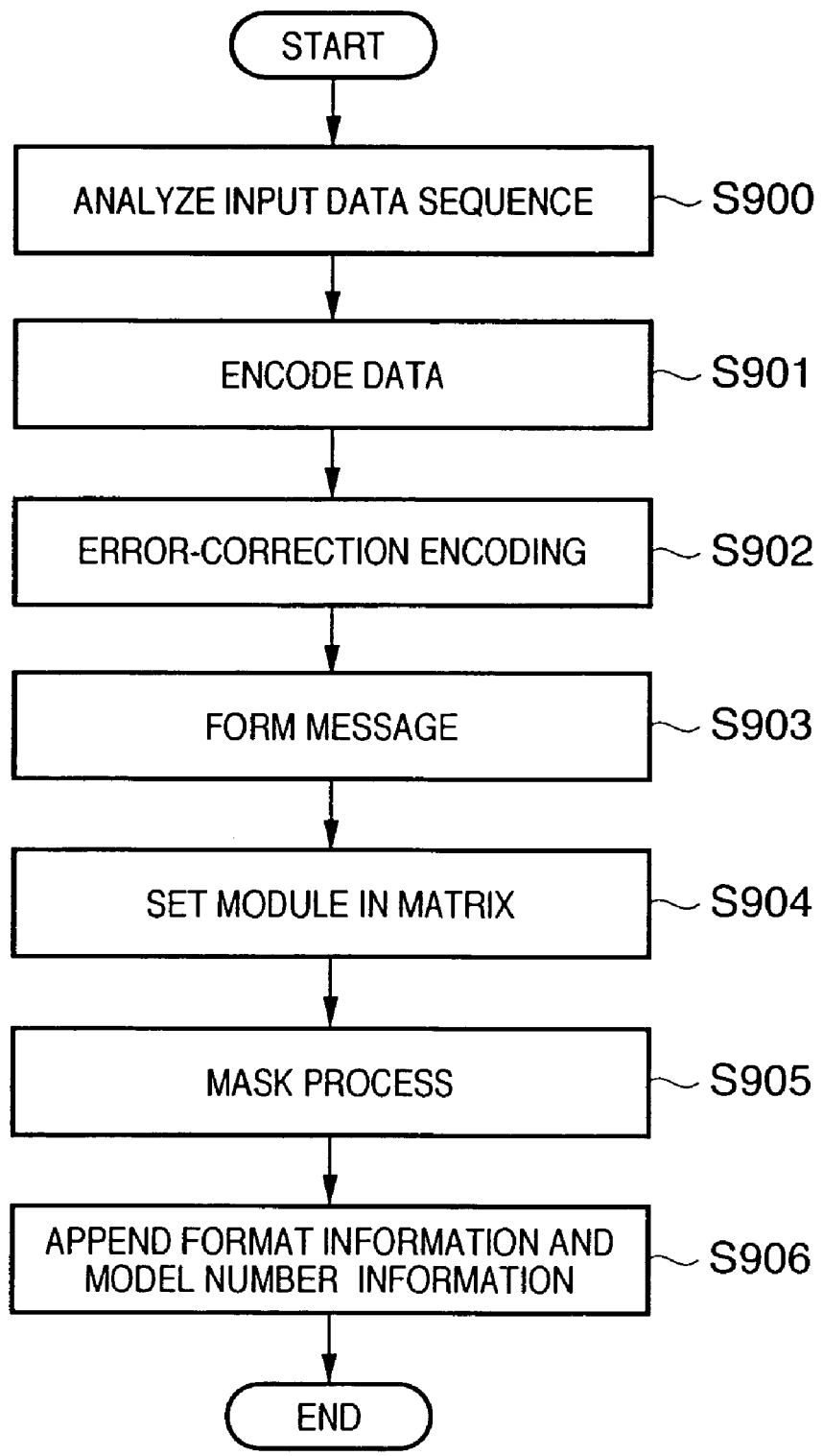
FIG. 16 is a flowchart for explaining the procedure for a process of encoding a data character string serving as vectorization control information using a two-dimensional barcode (QR code symbol: JIS X0510) 311 and appending it to an image.

FIG. 16 is a flowchart for explaining the procedure for a process of encoding a data character string as vectorization control information using a two-dimensional barcode (QR code symbol: JIS X0510) 311, and appending it to an image.

Data to be encoded in the two-dimensional barcode includes information as to whether vectorization of a document image is permitted/inhibited, and is represented by a numeral value of, e.g., permitted: "1"/inhibited: "0". Alternatively, the data may include a file ID managed in the storage device 111 of the MFP 100 itself.

In order to identify different types of characters to be encoded, an input data sequence is analyzed. Also, error detection and error correction levels are selected, and a minimum model number that can store input data is selected (step S900).

The input data sequence is converted into a predetermined bit sequence, and an indicator indicating a data mode (numeric, alphanumeric, 8-bit byte, kanji, etc.) and an end pattern are appended as needed. Furthermore, the bit sequence is converted into predetermined bit code words, thus encoding the data (step S901).

At this time, for the purpose of error correction, the code word sequence is segmented into a predetermined number of blocks in accordance with the model number and error correction level, and error correction code words are generated for respective blocks and are appended after the data code word sequence (step S902). Furthermore, the data code words of respective blocks obtained in step S902 are connected, and error correction code words and remainder code words as needed are connected after the data code word sequence to form a message (step S903).

Next, the code word module is set in a matrix together with a position detection pattern, separation pattern, timing pattern, alignment pattern, and the like (step S904). Furthermore, a mask pattern optimal to the symbol encoding region is selected, and is converted by calculating XORs with the module obtained in step S904 (step S905). Finally, type information and model number information are generated for the module obtained in step S905, thus completing a two-dimensional code symbol (step S906).

[Appending of Pointer Information]

A pointer information appending process in step S1211 will be described in detail below. In this embodiment, pointer information is appended by the same method as that for vectorization control information. Since this method has been described in the vectorization control information appending process, a detailed description thereof will be omitted. This process makes it possible to append control information that pertains to the re-use of electronified data or the like even to a paper document without vectorization control information.

As a means for appending additional information for the same purpose, for example, a method of directly appending pointer information to a document as a character string, and so-called watermarking methods including a method of embedding information by modulating the spacings of a character string in a document (especially, the spacings between neighboring characters), a method of embedding information in a halftone image in a document, and the like, can be applied in addition to the two-dimensional barcode described in this embodiment.

[Another Example of Vectorization Control Information]

Figure 17:
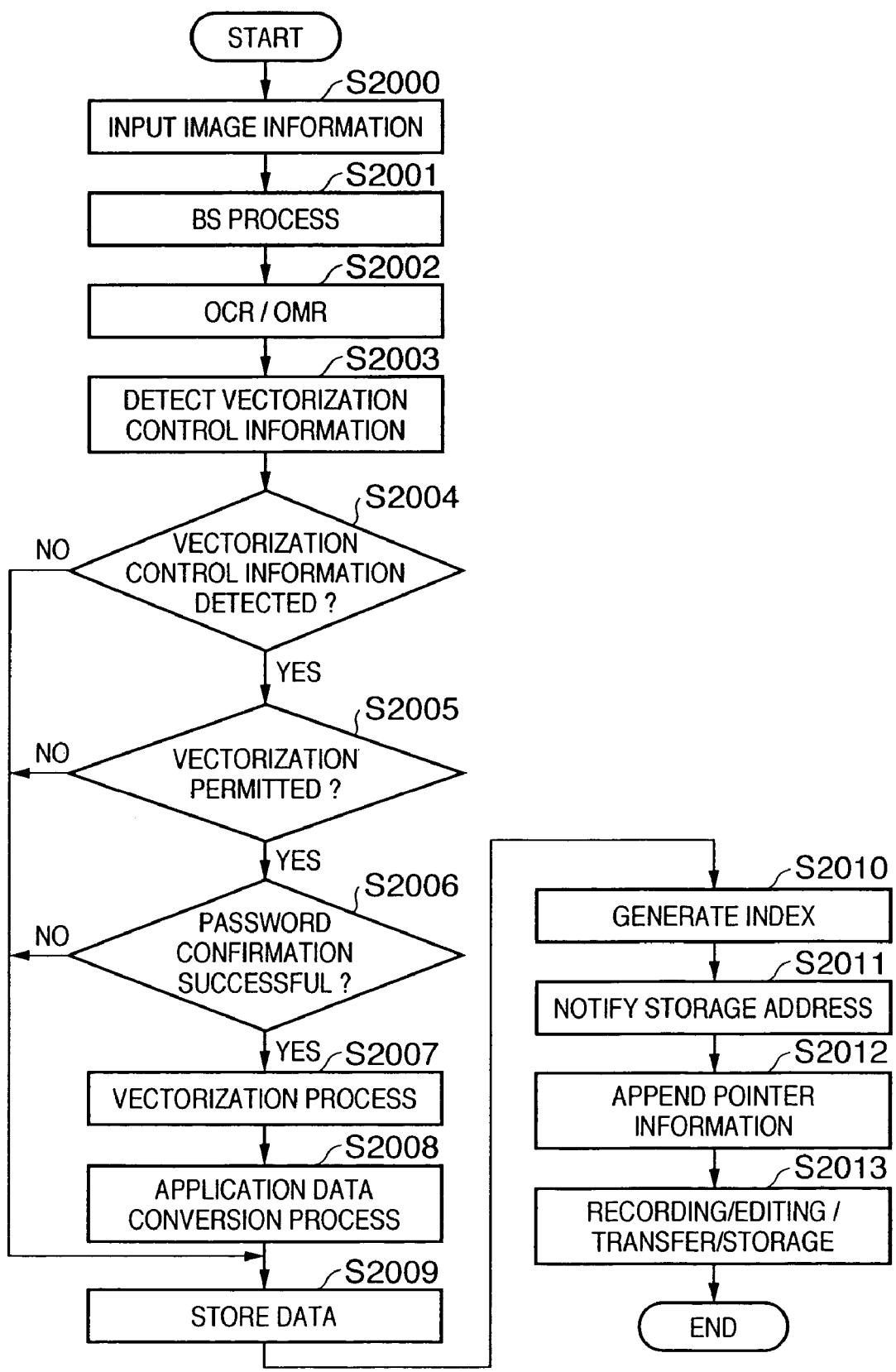
FIG. 17 is a flowchart for explaining the procedure for an image process which handles password-protected vectorization control information.

An example will be described wherein vectorization control information includes further information. More specifically, the vectorization control information can include not only information as to whether vectorization is permitted (or inhibited) but also a password for canceling (setting) the information. FIG. 17 is a flowchart for explaining the procedure for an image process which handles password-protected vectorization control information.

Steps S2000 to S2005 in FIG. 17 are the same as those in the above-mentioned flowchart of FIG. 3 except that information to be detected in the vectorization control information detection step (step S1203) includes a password in addition to vectorization permission/inhibition information. For this reason, even if a scanned document image is determined in step S2005 to be image information which can be vectorized, this embodiment requires the operator in step S2006 to input a password. If the input password does not coincide with a detected password (NO), vectorization is determined to be inhibited, and the flow branches to step S2009. The image is stored as image data. In other words, in this embodiment, the operator who is authorized to execute the vectorization process is limited to those who know a password, thereby improving the maintainability of image information.

Note that password-protected vectorization control information can be used for another purpose. For example, only an operator who knows the password may be allowed to arbitrarily select whether to inhibit vectorization, thereby increasing the flexibility of the system.

Second Embodiment

An image processing system and image processing method according to the second embodiment of the present invention will be described. The arrangement of the image processing system according to the second embodiment is shown in the block diagram of FIG. 1, similarly to the first embodiment. An MFP 100 is the same as that shown in FIG. 2.

[Example Which Executes Vectorization Control for Each Object]

In addition to the processes in the first embodiment, control of inhibition/permission of vectorization is not set independently for each page but for each of a plurality of objects obtained by block selection. This arrangement makes it possible to further increase the convenience of vectorization.

<<Generation/Appending of Vectorization Control Information>>

Vectorization control information for each of objects in a page can be set by the operator using a key operation unit equipped on the MFP 100.

Figure 18:
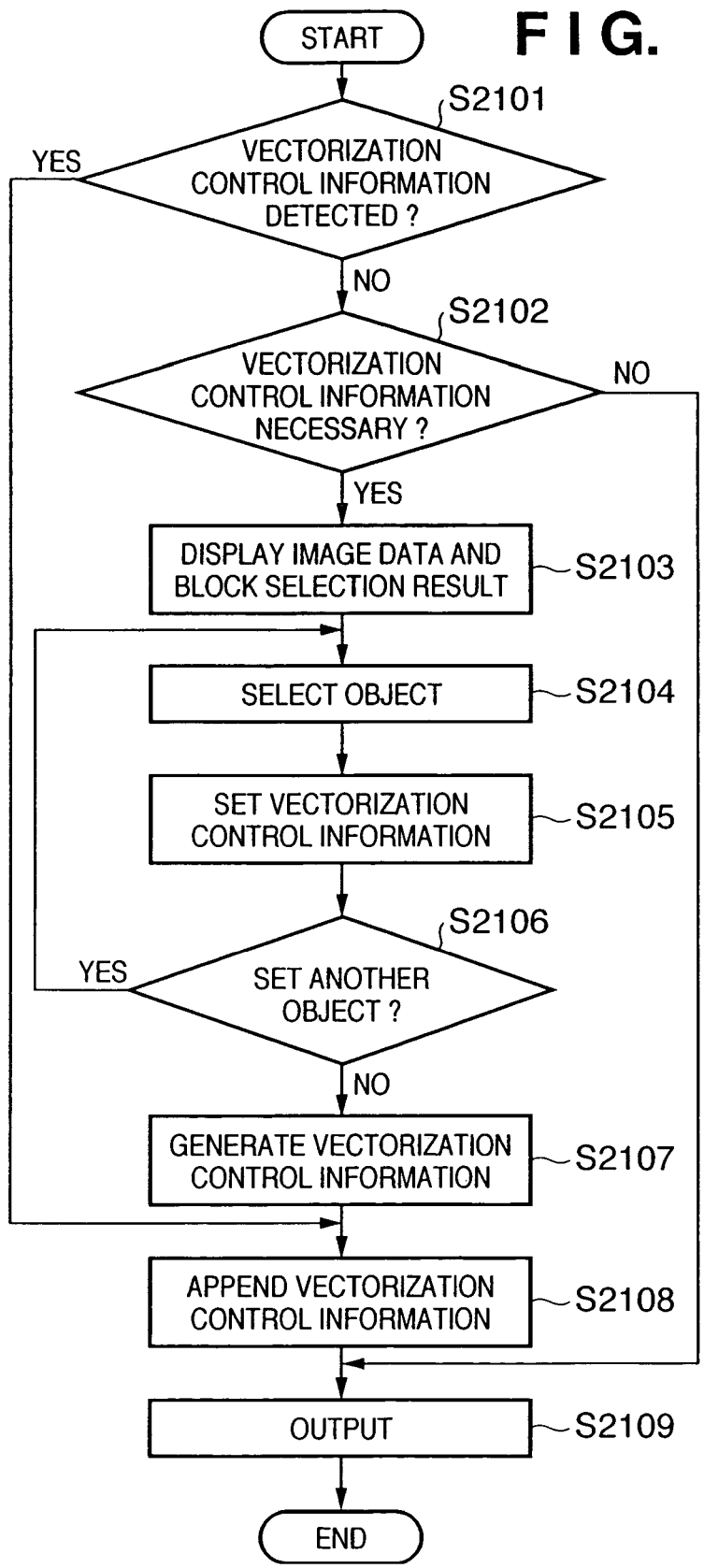
FIG. 18 is a flowchart for explaining the procedure for a vectorization control setting process for each object by a key operation unit equipped on an MFP 100.

FIG. 18 is a flowchart for explaining the procedure for a vectorization control setting process for each object by the key operation unit equipped on the MFP 100. The vectorization control setting process will be described with reference to FIG. 18.

It is first determined whether an image to be output has vectorization control information (step S2101). If no vectorization control information is detected (NO), the flow branches to step S2102. In step S2102, a condition set by the operator as to whether to execute vectorization control is determined. If the vectorization control is necessary (YES), vectorization control information is set and generated in step S2103 and subsequent steps.

On the other hand, if it is determined in step S2102 that vectorization control information is unnecessary (NO), an image is directly output in step S2109 without appending the vectorization control information in step S2108. If the image to be output has any vectorization control information in step S2101 (YES), the flow directly advances to the vectorization control information appending process in step S2108. The vectorization control information is appended to the image, and in an output step (step S2109), the image appended with the vectorization control information is output.

Figure 19:
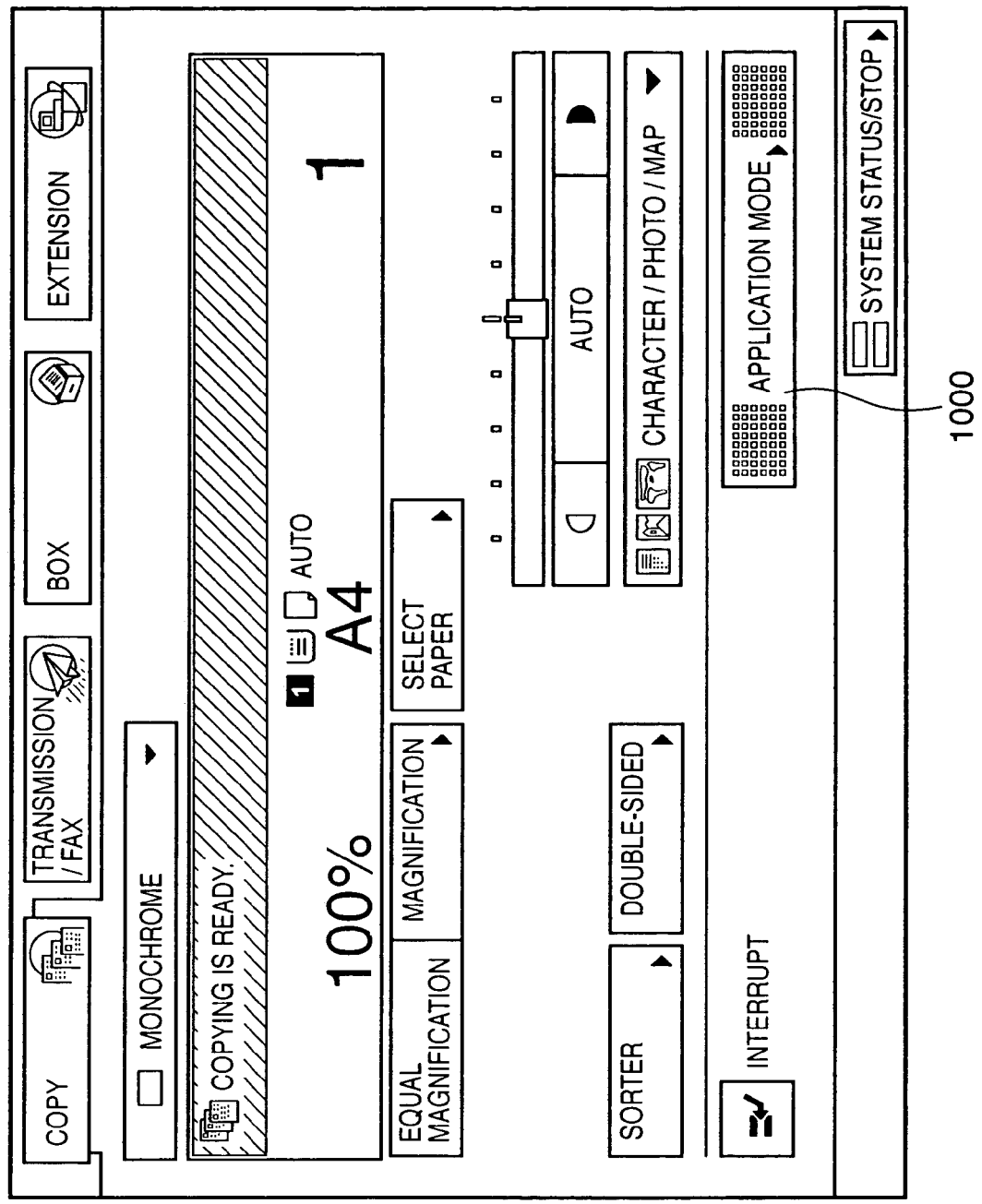
FIG. 19 is a view showing an example of a copy basic window of the key operation unit of the MFP 100.

To generate vectorization control information, an image is displayed on the key operation unit (step S2103). FIG. 19 is a view showing an example of a copy basic window of the key operation unit of the MFP 100. Since a function as described here is often placed in an inner layer by one level in this embodiment, the function is classified as one function of an "application mode".

Figure 20:
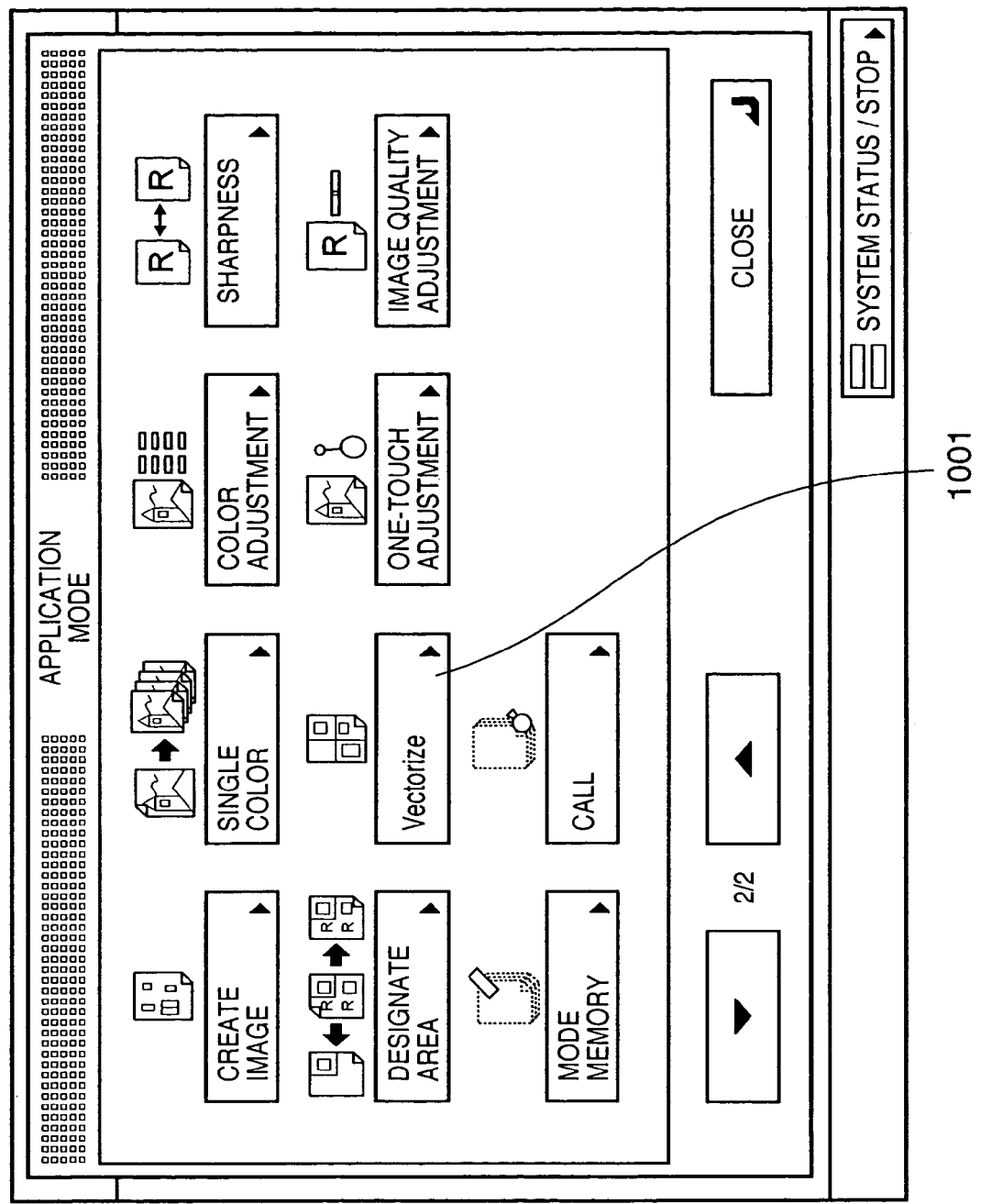
FIG. 20 is a view showing an example of an application mode window of the key operation unit of the MFP 100.

When an application mode key 1000 is pressed, the window shifts to a window as shown in FIG. 20 where applied functions are listed. FIG. 20 is a view showing an example of an application mode window of the key operation unit of the MFP 100. In FIG. 20, a Vectorize key 1001 indicates a function that pertains to vectorization control information setting.

Figure 21:
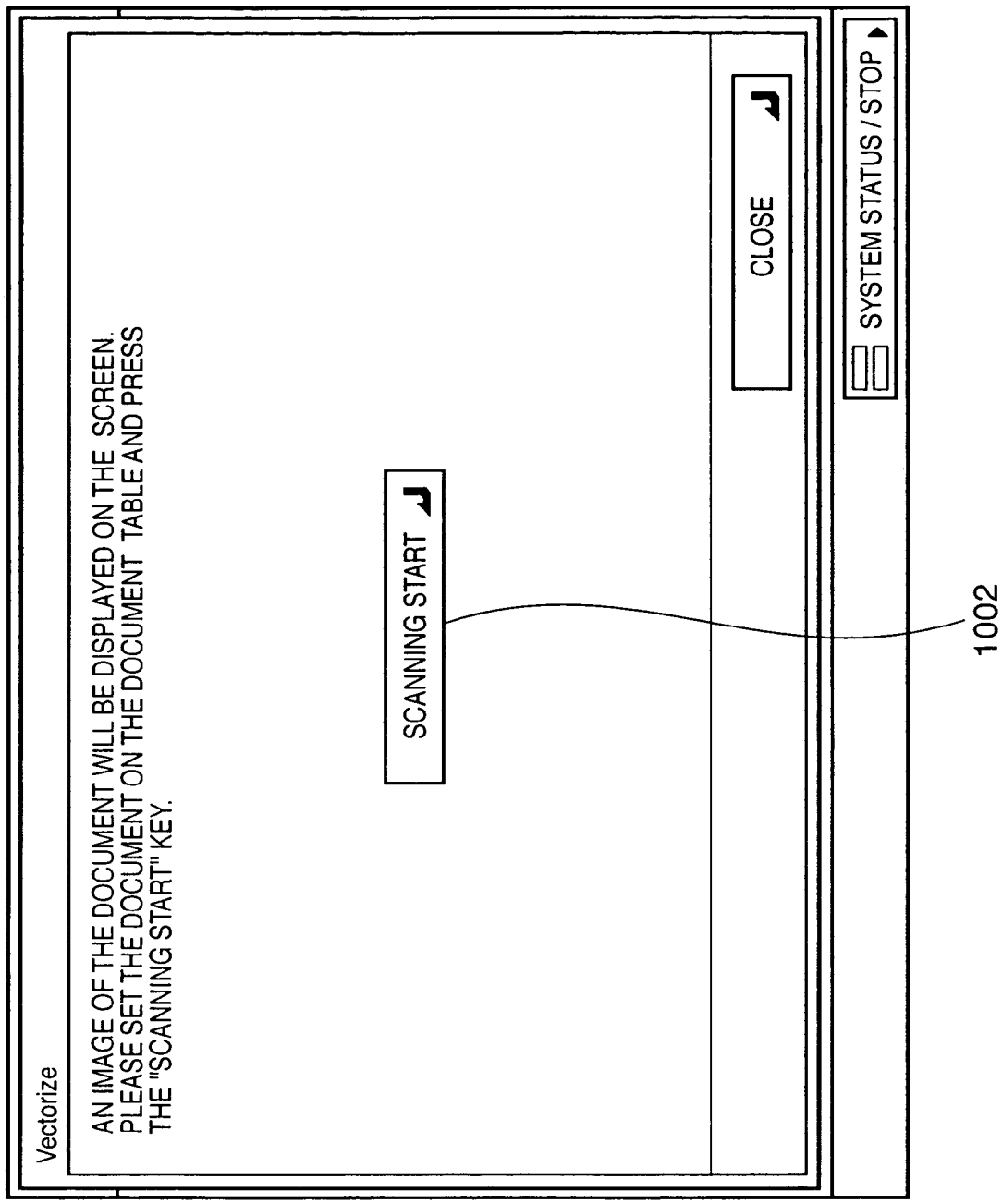
FIG. 21 is a view showing an example of a Vectorize window of the key operation unit of the MFP 100.
Figure 22:
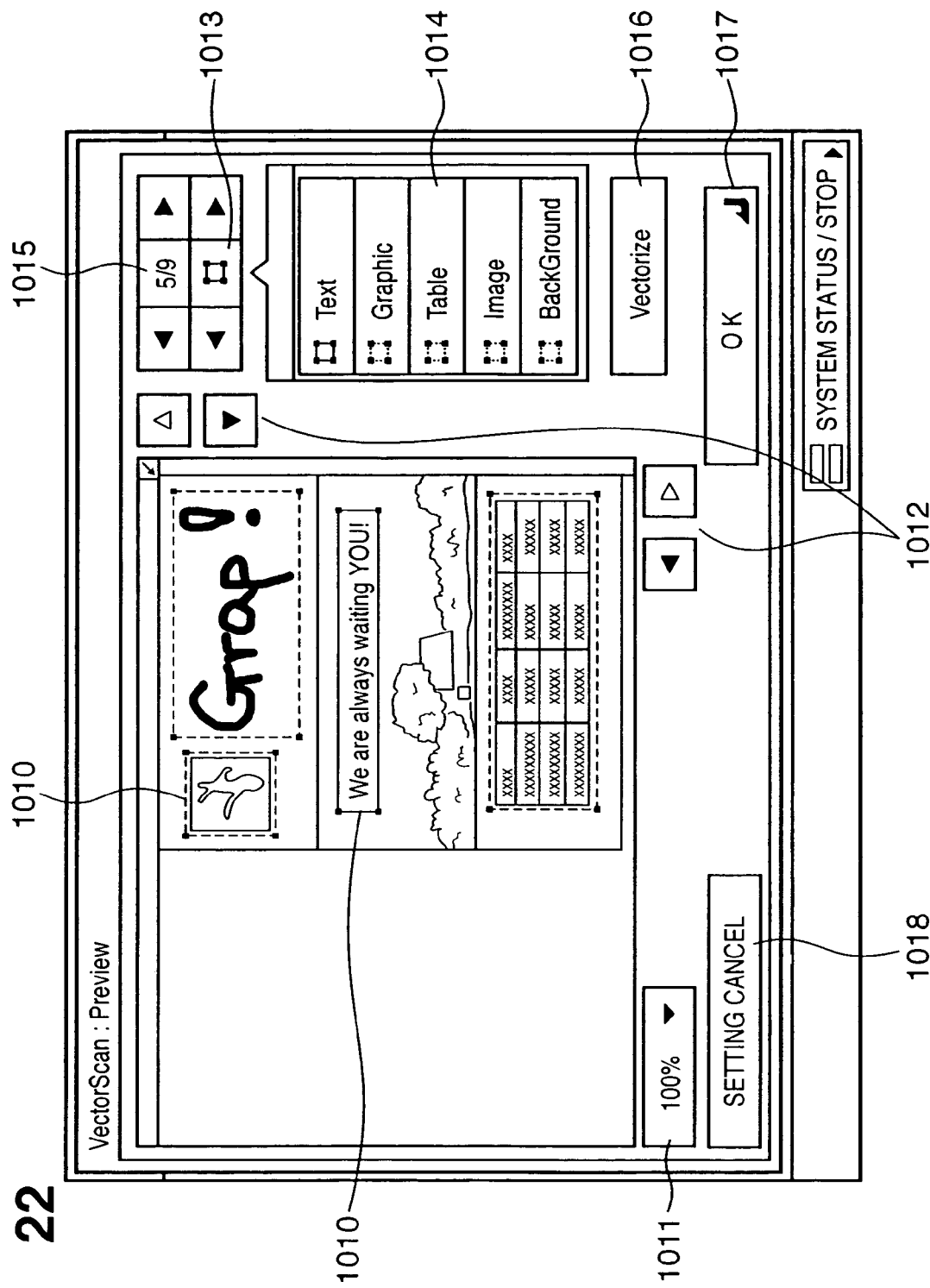
FIG. 22 is a view showing an example of a window after image scanning of the key operation unit of the MFP 100.

When the operator presses the Vectorize key 1001, a window shown in FIG. 21 is displayed. FIG. 21 is a view showing an example of a Vectorize window of the key operation unit of the MFP 100. When the operator presses a scanning start key 1002 shown in FIG. 21, the image scanning unit 110 scans a set document, and a window as shown in FIG. 22 is displayed on the key operation unit. FIG. 22 is a view showing an example of a window after image scanning on the key operation unit of the MFP 100.

As shown in FIG. 22, a scanned image and a result obtained by dividing image information in block selection are displayed in frames as indicated by reference numeral 1010. A block selection process can be executed in the same manner as in the above-mentioned embodiment. The properties and positions of objects constituting the display screen are represented by, e.g., colors and rectangles. An image can be displayed as a reduced image. An enlargement/reduction key 1011 can increase/reduce a display image to an arbitrary size. A portion which exceeds the display area due to enlargement can be viewed by scrolling across and down using a scroll button 1012.

As described above, after the image data and the block selection result are displayed in step S2103, an object is selected (step S2104). In FIG. 22, a text object containing a character string "We are always waiting YOU!" at the center is selected. The object is enclosed in a red solid frame while the remaining objects are enclosed in dashed frames of colors indicating their properties. For example, a text object can be represented by red; a graphic object, blue; a table object, green; and an image object, yellow. The remaining object can be represented as a background object. The background object is an image portion left after extracting the objects constituting the image and is not enclosed in a rectangular frame.

As methods of selecting an object, there are available a method of directly touching the object within the corresponding frame 1010 and a method of designating the object using object selection keys 1013. By either method, the rectangular frame of a selected object becomes a solid one while the rectangular frames of the unselected objects become dashed ones. At the same time, one of object property keys 1014 corresponding to the property of the selected object is selected.

If a document containing a plurality of pages is scanned using an ADF or the like, any page can be selected using page selection buttons 1015. When a predetermined page is selected, the image and a block selection result of the page are displayed in the frames 1010.

In a process (step S2105) of setting vectorization control information as to whether to permit vectorization of a selected object is determined by a Vectorize key 1016. More specifically, if setting is permitted, the Vectorize key 1016 is highlighted; otherwise, the Vectorize key 1016 is normally displayed. In the case shown in FIG. 22, vectorization of a selected object is not permitted. When an OK key 1017 is pressed, a setting having been made up to that time is saved as the vectorization control information. On the other hand, when a setting cancel key 1018 is pressed, a setting having been made up to that time is discarded, and the window returns to the copy basic window shown in FIG. 19.

With the above-mentioned process, vectorization control information setting of the object of interest ends. If the operator wants to make the same setting for another object, the flow branches in step S2106 and returns to the object selection step in step S2104 to repeat the setting operation. After the vectorization control information setting ends, steps S2107 to S2109 output data.

The vectorization control information thus saved for each object is encoded as a data sequence of control information in a two-dimensional barcode generated and appended for each document image in the above-mentioned embodiment and is appended to an output image. Note that a two-dimensional barcode is appended in the same manner as in the above-mentioned embodiment. Thus, vectorization of a paper document can freely be controlled in accordance with a request from the operator.

As described with reference to vectorization control information for each page of the above-mentioned embodiment, a method of directly appending a character string in a document or a so-called watermarking method including a method of embedding information by modulating the spacings of a character string in a document (especially, the spacings between neighboring characters), a method of embedding information in a halftone image in a document, and the like may be adopted.

[Another Example Which Executes Vectorization Control for Each Object]

Figure 23:
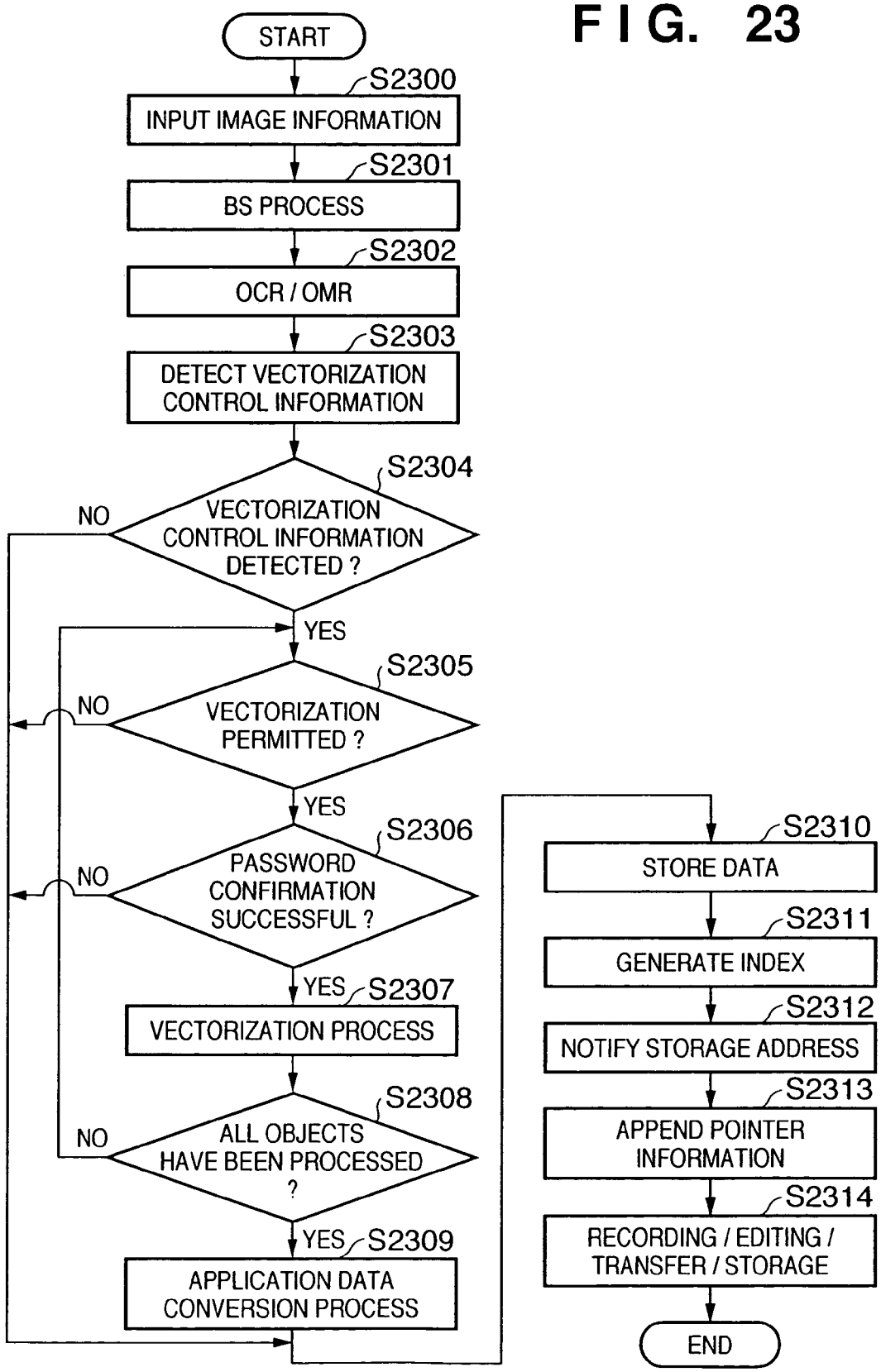
FIG. 23 is a flowchart for explaining the procedure for an image process which handles password-protected vectorization control information.

Another example which uses vectorization control information for each object can include not only information as to whether vectorization is permitted (or inhibited) but also a password for canceling (setting) the information for each object. FIG. 23 is a flowchart for explaining the procedure for an image process which handles password-protected vectorization control information.

Steps S2300 to S2307 in FIG. 23 are the same as steps S2000 to S2007 in FIG. 17 described as another example of the first embodiment except that information to be detected in the vectorization control information detection step (step S1203) includes a password in addition to vectorization permission/inhibition information. Even if a scanned document image is determined in step S2305 to be image information which can be vectorized, this embodiment requires the operator in step S2306 to input a password. If the input password does not coincide with a detected password (NO), vectorization is determined to be inhibited, and the flow branches to step S2310. The image is stored as image data.

When the vectorization process in step S2307 ends for one object, it is determined in step S2308 whether all objects in a page have been processed. If any more object to be vectorized remains, the processes from step S2305 are repeated for the next object. In other words, in this embodiment, the operator who is authorized to execute the vectorization process is limited to those who know a password. This makes it possible to improve the maintainability of image information and execute advanced control of the re-use of electronified data.

Note that password-protected vectorization control information can be used for another purpose. For example, only an operator who knows the password may be allowed to arbitrarily select whether to inhibit vectorization, thereby increasing the flexibility of the system.

If object control information includes object feature information (e.g., containing a specific character string, having a specific shape, or the like) which inhibits vectorization, control of inhibition/permission of vectorization for an object having a specific feature is allowed.

If vectorization control information includes the layout information of objects in a document, an object to be subjected to vectorization control can be designated in the layout information. This results in higher-precision control of inhibition/permission of vectorization.

Other Embodiment

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

According to the present invention, whether to convert an original paper document into re-usable vector data before obtaining vector data from the paper document can appropriately be set.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-407770 filed on Dec. 5, 2003, which is hereby incorporated by reference herein.

What is claimed is:

1. An image processing system comprising:
  a reading unit, adapted to read a document to obtain image information;
  a storage unit, adapted to store the image information;
  a vectorization unit, adapted to vectorize the image information;
  a detection unit, adapted to detect control information, which is appended to the document, from the image information;
  a determination unit, adapted to determine on the basis of the control information whether vectorization of the image information is permitted or inhibited; and
  a control unit, adapted to cause said vectorization unit to convert the image information into vector data if said determination unit determines that vectorization of the image information is permitted, and to directly store the image information in said storage unit if said determination unit determines that vectorization of the image information is inhibited.

2. The system according to claim 1, further comprising
a character recognition unit, adapted to execute character code conversion for the image information,
wherein if said determination unit determines that character code conversion of the image information is not inhibited, said control unit causes said character recognition unit to execute character code conversion for the image information.

3. The system according to claim 1, further comprising
an image conversion unit, adapted to convert the image information into a predetermined image format,
wherein if said determination unit determines that image conversion of the image information into the predetermined format is not inhibited, said control unit causes said image conversion unit to execute image conversion for the image information.

4. The system according to claim 1, further comprising a format conversion unit, adapted to convert the image information into a format which can be handled by predetermined document creation software.

5. The system according to claim 1, further comprising
a division unit, adapted to divide the image information into a plurality of objects,
wherein if the control information is present in each of the plurality of objects, said control unit controls said vectorization unit independently for each object to execute or inhibit vectorization.

6. The system according to claim 1, further comprising:
a detection unit, adapted to detect user authentication information from the control information;
a request unit, adapted to request input of the user authentication information before vectorization of the image information by said vectorization unit; and
a collating unit, adapted to collate input user authentication information with the user authentication information detected by said detection unit,
wherein said control unit permits said vectorization unit to convert the image information into vector data on the basis of a result of matching of user authentication information by said collating unit.

7. An image processing method comprising:
a reading step of reading a document to obtain image information;
a storage step of storing the image information in a storage unit;
a vectorization step of vectorizing the image information;
a detection step of detecting control information, which is appended to the document, from the image information;
a determination step of determining on the basis of the control information whether vectorization of the image information is permitted or inhibited; and
a control step of converting the image information into vector data in the vectorization step if it is determined in the determination step that vectorization of the image information is permitted, and directly storing the image information in the storage unit in the storage step if it is determined in the determination step that vectorization of the image information is inhibited.

8. A program stored on a computer-readable medium for controlling a computer to execute:
a reading procedure for reading a document to obtain image information;
a storage procedure for storing the image information in a storage unit;
a vectorization procedure for vectorizing the image information;
a detection procedure for detecting control information, which is appended to the document, from the image information;
a determination procedure for determining on the basis of the control information whether vectorization of the image information is permitted or inhibited; and
a control procedure for converting the image information into vector data in the vectorization procedure if it is determined in the determination procedure that vectorization of the image information is permitted, and to directly storing the image information in the storage unit in the storage procedure if it is determined in the determination procedure that vectorization of the image information is inhibited.

* * * * *